US012583066B2

(12) United States Patent
Gillies et al.

(10) Patent No.: US 12,583,066 B2
(45) Date of Patent: Mar. 24, 2026

(54) SYSTEM AND METHOD FOR REMOVING METAL FASTENERS EMBEDDED IN WOOD PRODUCTS

(71) Applicant: Urban Machine, Inc., Oakland, CA (US)

(72) Inventors: Andrew Gillies, Lafayette, CA (US); Brett Jaeger, Oakland, CA (US); Aidan Barry, San Francisco, CA (US); Gabrielle Zacks, Berkeley, CA (US); Maxwell Micali, Oakland, CA (US); Alex Thiele, Berkeley, CA (US); Tyler Compton, Berkeley, CA (US); Eric Law, Lafayette, CA (US)

(73) Assignee: Urban Machine, Inc., Oakland, CA (US)

( * ) Notice: Subject to any disclaimer, the term of this patent is extended or adjusted under 35 U.S.C. 154(b) by 0 days.

(21) Appl. No.: 18/784,702

(22) Filed: Jul. 25, 2024

(65) Prior Publication Data
US 2025/0033151 A1      Jan. 30, 2025

Related U.S. Application Data

(60) Provisional application No. 63/528,859, filed on Jul. 25, 2023.

(51) Int. Cl.
*B23P 19/06* (2006.01)
*B25J 9/00* (2006.01)
(Continued)

(52) U.S. Cl.
CPC ............. *B23P 19/06* (2013.01); *B25J 9/0093* (2013.01); *B25J 9/1679* (2013.01); *B25J 9/1697* (2013.01); *B25J 9/026* (2013.01)

(58) Field of Classification Search
CPC ....... B23P 19/06; B23P 19/041; B25J 9/0093; B25J 9/1679; B25J 9/026; B23D 53/026; B26D 7/2635
See application file for complete search history.

(56) References Cited

U.S. PATENT DOCUMENTS 3,771,209 A * 11/1973 Bennett, Jr. ........... B23P 19/041
                                                    219/603
4,418,260 A * 11/1983 Detrick ................. B23P 19/041
                                                    219/673
(Continued)

FOREIGN PATENT DOCUMENTS

CN        111922434 A      11/2020
KR      20110123068 A      11/2011

OTHER PUBLICATIONS

International Search Report received in PCT/US24/39645 dated Dec. 4, 2024.

*Primary Examiner* — Lee A Holly
(74) *Attorney, Agent, or Firm* — Run8 Patent Group, LLC; Peter Miller

(57) ABSTRACT

One variation of a method includes: receiving a recycled wood workpiece in an inductor volume; accessing an image of the inductor volume; based on a set of features detected in the image, detecting a first reflective elliptical object embedded in a surface of the recycled wood workpiece and deriving a first location of the first reflective elliptical object. This variation of the method further includes: identifying the first reflective elliptical object as a first metal fastener occupying the first location; triggering the stage to drive an inductor, arranged within the inductor volume, within a target coupling distance of the first location of the first metal fastener; and triggering a driver to supply a target alternating current to the inductor to heat the first metal fastener via
(Continued)

induction heating and to reduce retention of the first metal
fastener by the recycled wood workpiece.

15 Claims, 9 Drawing Sheets

(51) Int. Cl.
    *B25J 9/16*              (2006.01)
    *B25J 9/02*              (2006.01)

(56)               References Cited

U.S. PATENT DOCUMENTS

| | | | |
|---|---|---|---|
| 4,750,255 A * | 6/1988 | Hufnagel | B26D 7/2635 |
| | | | 83/943 |
| 5,211,094 A * | 5/1993 | Johnson | B23P 19/041 |
| | | | 83/507 |
| 5,463,808 A * | 11/1995 | Harris | B23P 19/041 |
| | | | 29/244 |
| 6,135,003 A * | 10/2000 | Mason | B23D 53/026 |
| | | | 83/788 |
| 2007/0107212 A1 * | 5/2007 | Holliger | B23P 19/041 |
| | | | 29/772 |

\* cited by examiner

"RECYCLED WOOD
WORKPIECE"

S100

"SURFACE LAYER"

"RECYCLED WOOD WORKPIECE"

122
120
123
124

"INNER LAYER"

"RECYCLED WOOD WORKPIECE"

SYSTEM AND METHOD FOR REMOVING METAL FASTENERS EMBEDDED IN WOOD PRODUCTS

CROSS-REFERENCE TO RELATED APPLICATIONS

This application claims the benefit of U.S. Provisional Application No. 63/528,859, filed on 25 Jul. 2023, which is incorporated in its entirety by this reference.

This application is related to U.S. patent application Ser. No. 18/117,240, filed on 3 Mar. 2023, which is incorporated in its entirety by this reference.

TECHNICAL FIELD

This invention relates generally to the field of material recycling and more specifically to a new and useful system for autonomously removing metal fasteners embedded in wood products in the field of material recycling.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1:
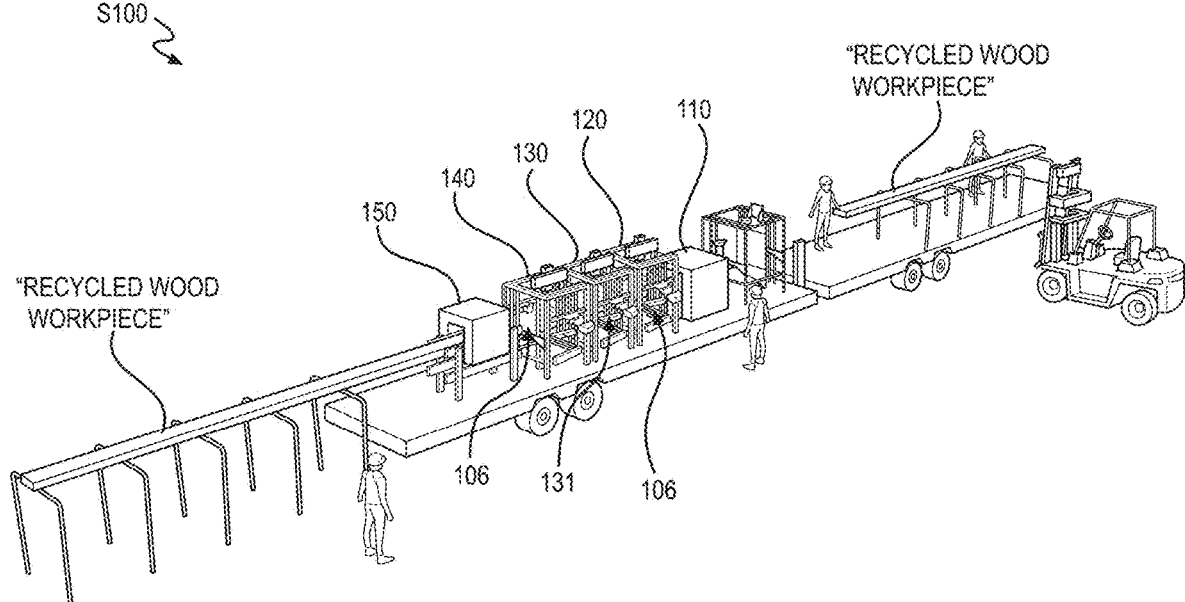
FIG. 1 is a schematic representation of a system.
Figure 2A:
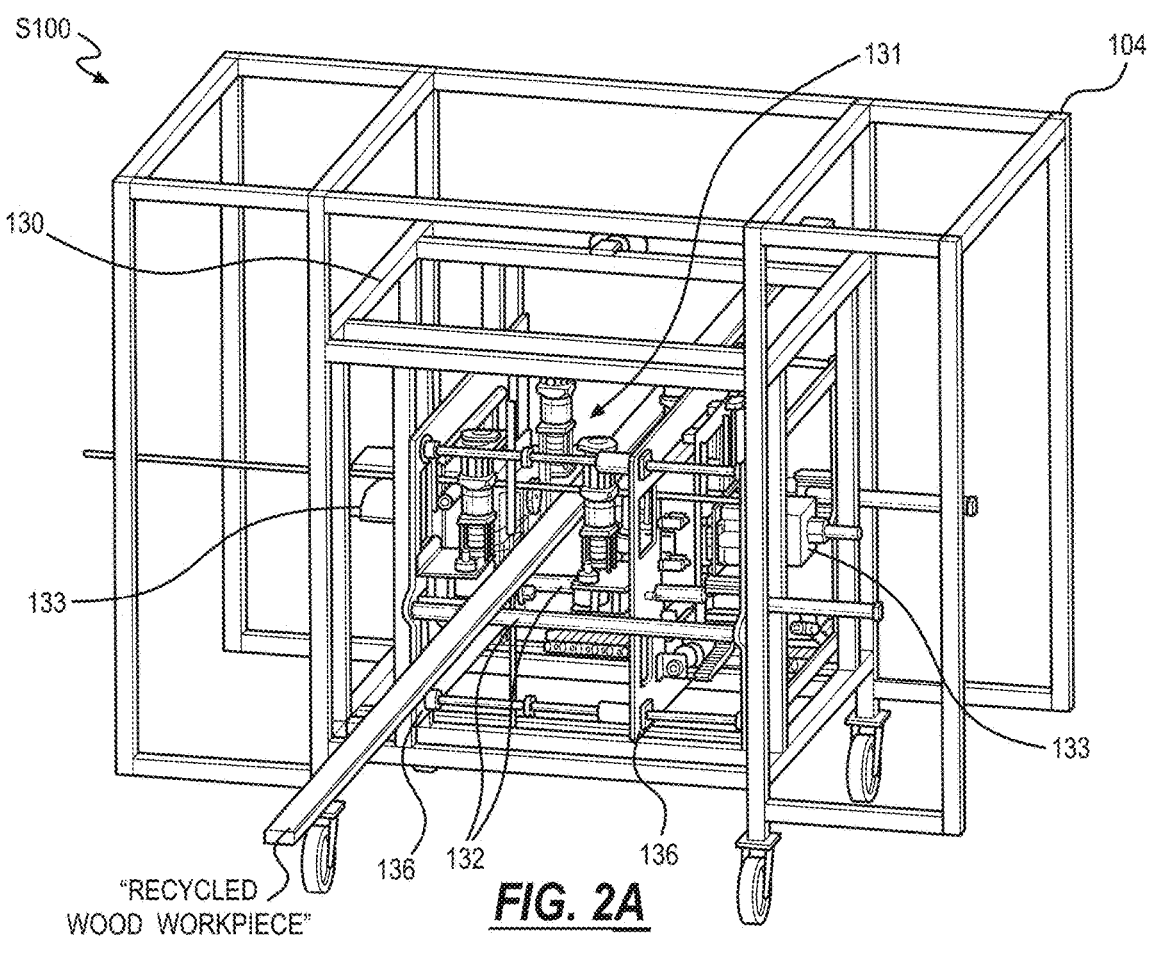
FIGS. 2A, 2B, 2C, and 2D are schematic representations of one variation of the system.
Figure 2B:
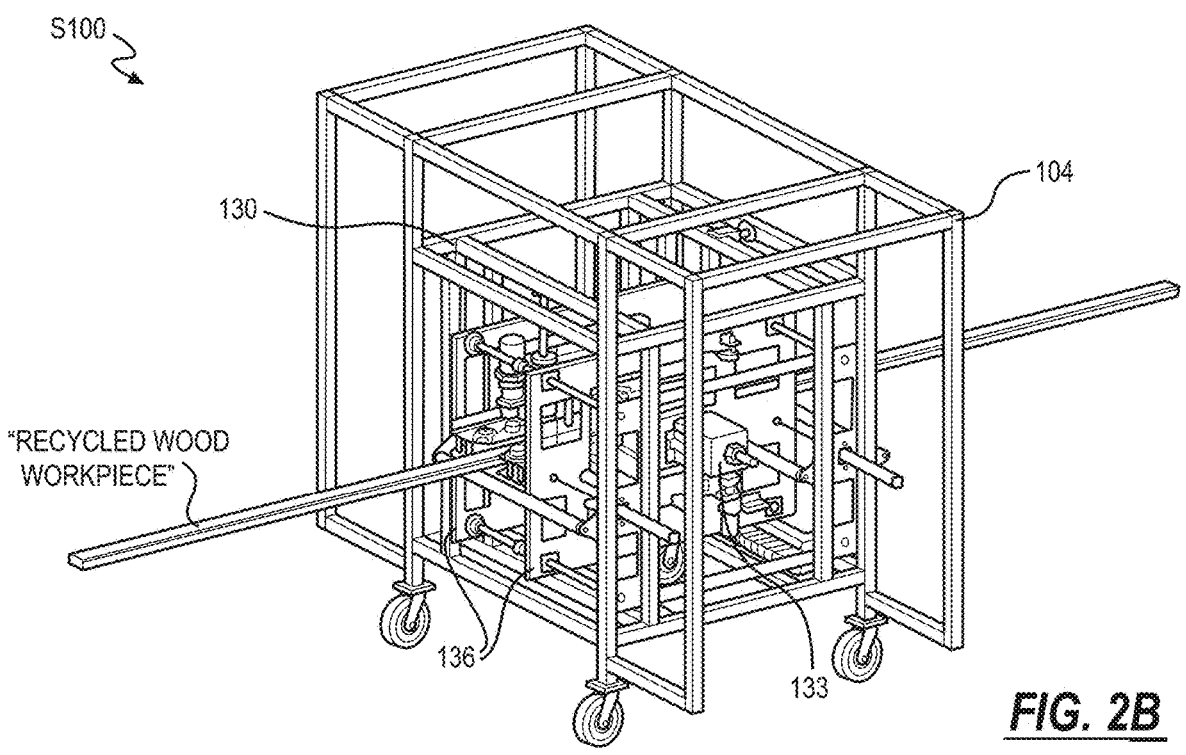
Figures 2C, 2D:
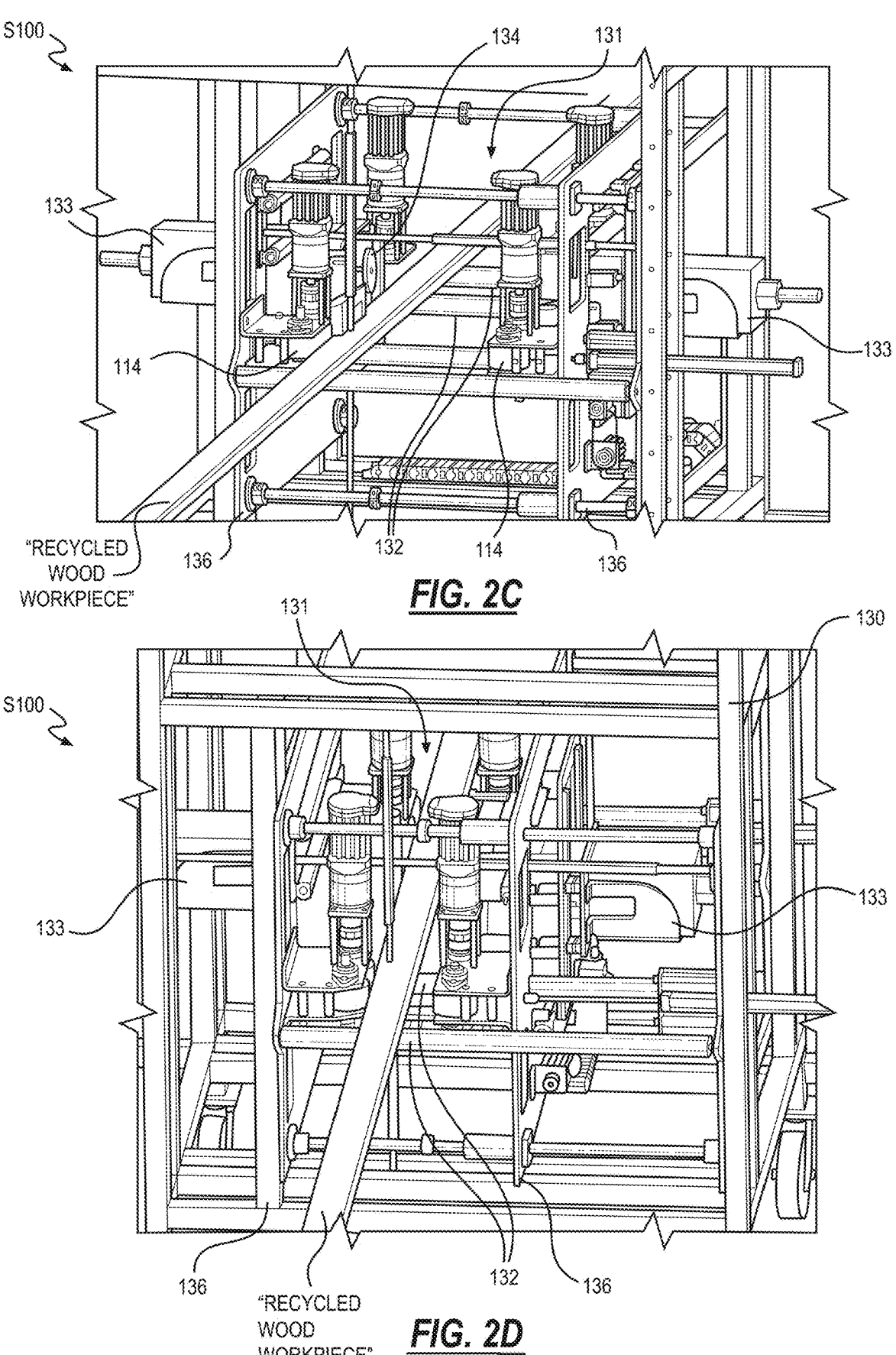
Figures 3A, 3B, 3C:
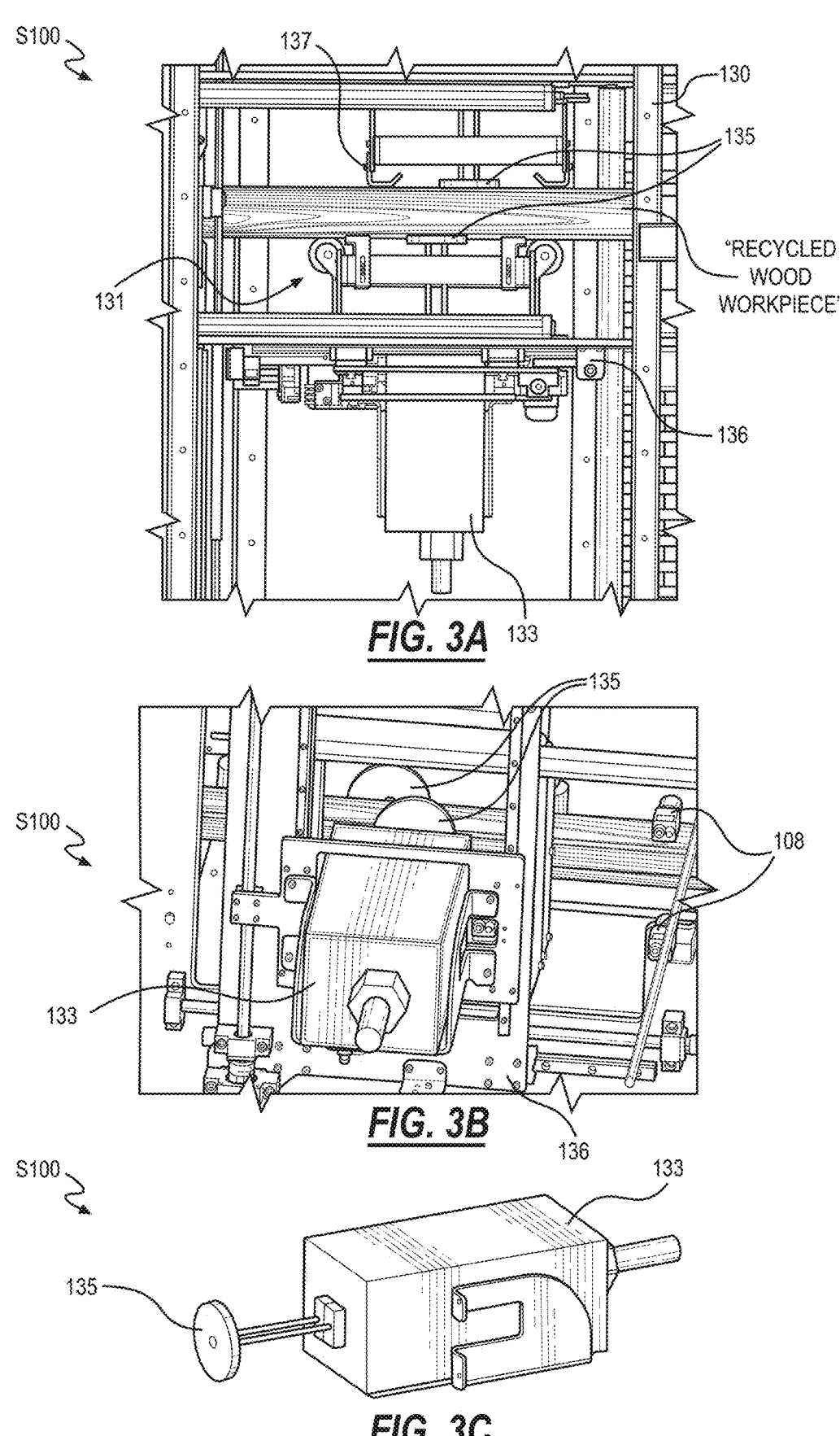
FIGS. 3A, 3B, and 3C are schematic representations of one variation of the system.

As shown in FIG. 1, a system 100 for autonomously removing metal fasteners embedded in a recycled wood workpiece includes: a chassis 104; a conveyance subsystem 110; a fastener head removal module 120; an induction module 130; a fastener shank removal module 140; a metal scan module 150; and/or a primary controller 170.

1.1 Conveyance Subsystem

As shown in FIG. 1, the conveyance subsystem no is configured to receive recycled wood workpieces populated with metal fasteners and move these recycled wood workpieces from an entry of the chassis 104, through modules (e.g., a fastener head removal module 120, an induction module 130, a fastener shank removal module 140, a metal scan module 150), and toward an exit of the chassis 104.

1.2 Fastener Head Removal Module

Figure 4A:
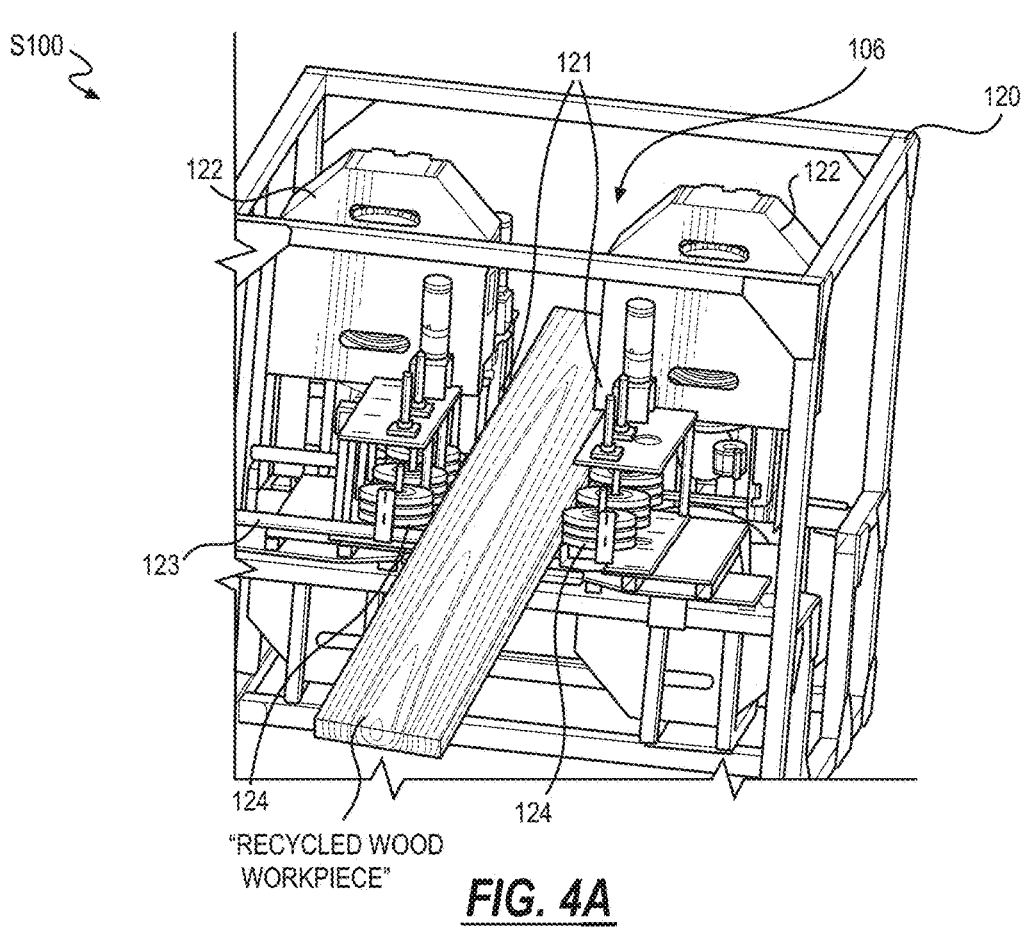
FIGS. 4A and 4B are schematic representations of one variation of the system.
Figure 4B:
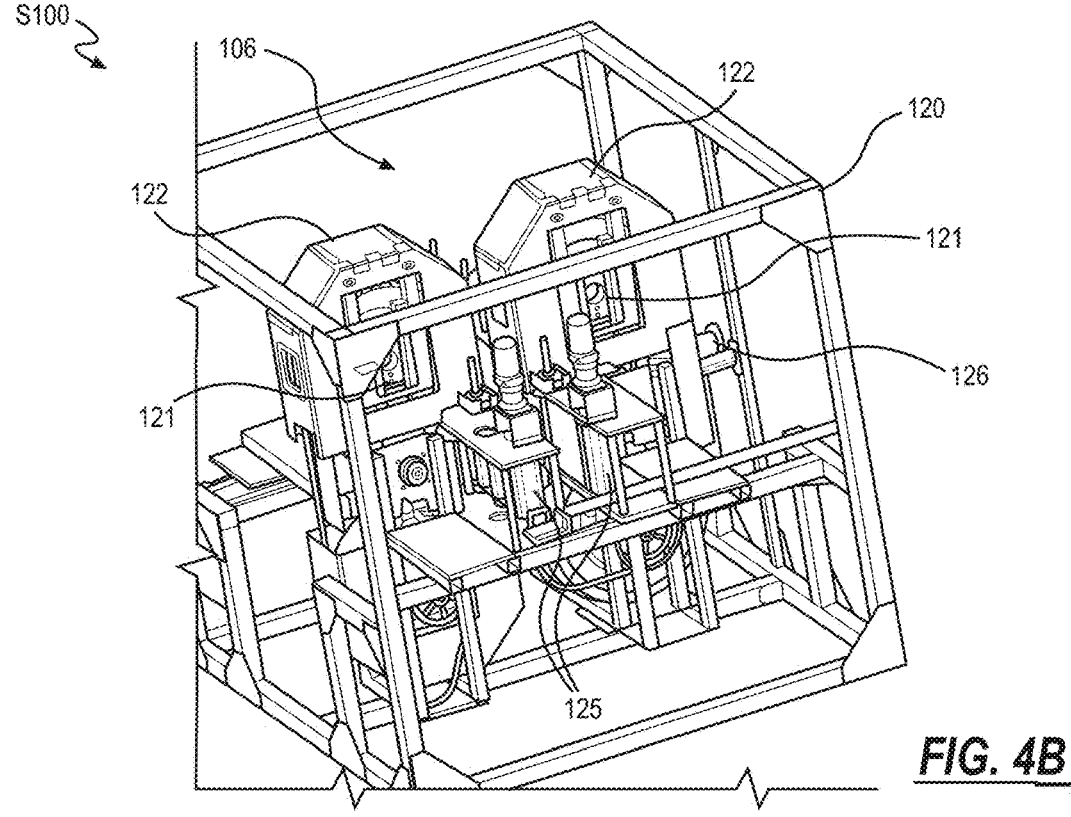
Figure 5:
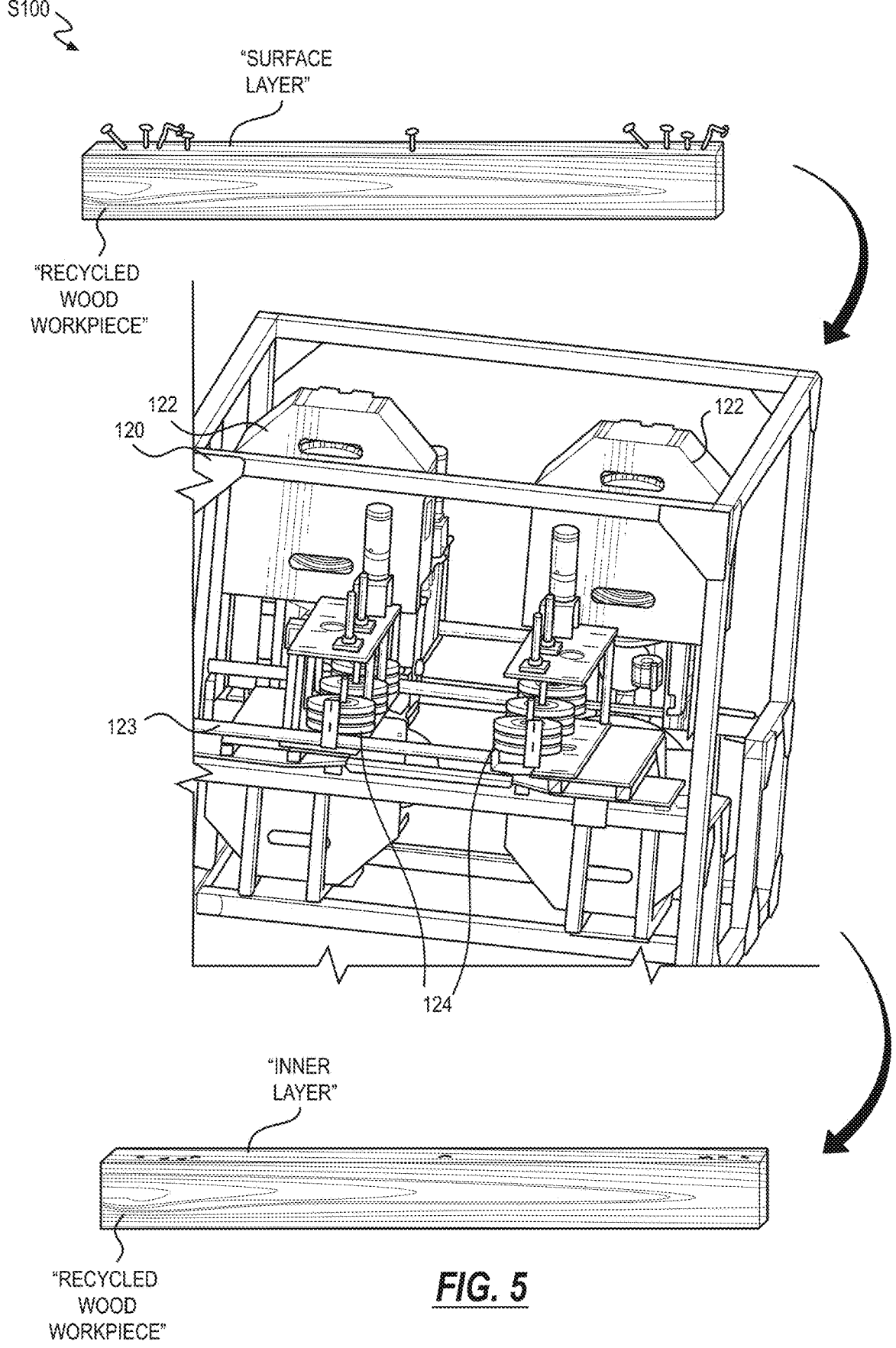
FIG. 5 is a schematic representation of one variation of the system.

As shown in FIGS. 4A, 4B, and 5, the fastener head removal module 120 defines a work volume 106 and includes a first cutter 121 and a second cutter 121. The first cutter 121 is arranged within the work volume 106 and is configured to: resect heads from shanks of metal fasteners embedded within a first side of the recycled wood workpiece occupying the work volume 106; and remove a surface layer of wood material from the first side of the recycled wood workpiece. The second cutter 121 is arranged within the work volume 106 adjacent the first cutter 121 and is configured to: resect heads from shanks of metal fasteners embedded within a second side, opposite the first side, of the recycled wood workpiece; and remove the surface layer of wood material from the second side of the recycled wood workpiece.

1.2 Induction Module

As shown in FIGS. 2A, 2B, 2C, 2D, 3A, 3B, and 3C, the induction module 130 defines the inductor volume 131 and includes: a conveyor configured to drive the recycled wood workpiece, populated with metal fasteners, through the inductor volume 131; a first sensor 108 facing the inductor volume 131 and configured to output a signal representing a first location of a first metal fastener embedded in the recycled wood workpiece; an inductor 133 arranged within the inductor volume 131 and configured to generate an electromagnetic field that couples to and heats the first metal fastener via induction heating, the first metal fastener burning wood material, in the recycled wood workpiece, proximal the first location to reduce retention of the first metal fastener by the recycled wood workpiece; and an inductor stage 136 configured to locate the inductor 133 proximal the first location of the first metal fastener.

1.4 Fastener Shank Removal Module

Figures 6A, 6B:
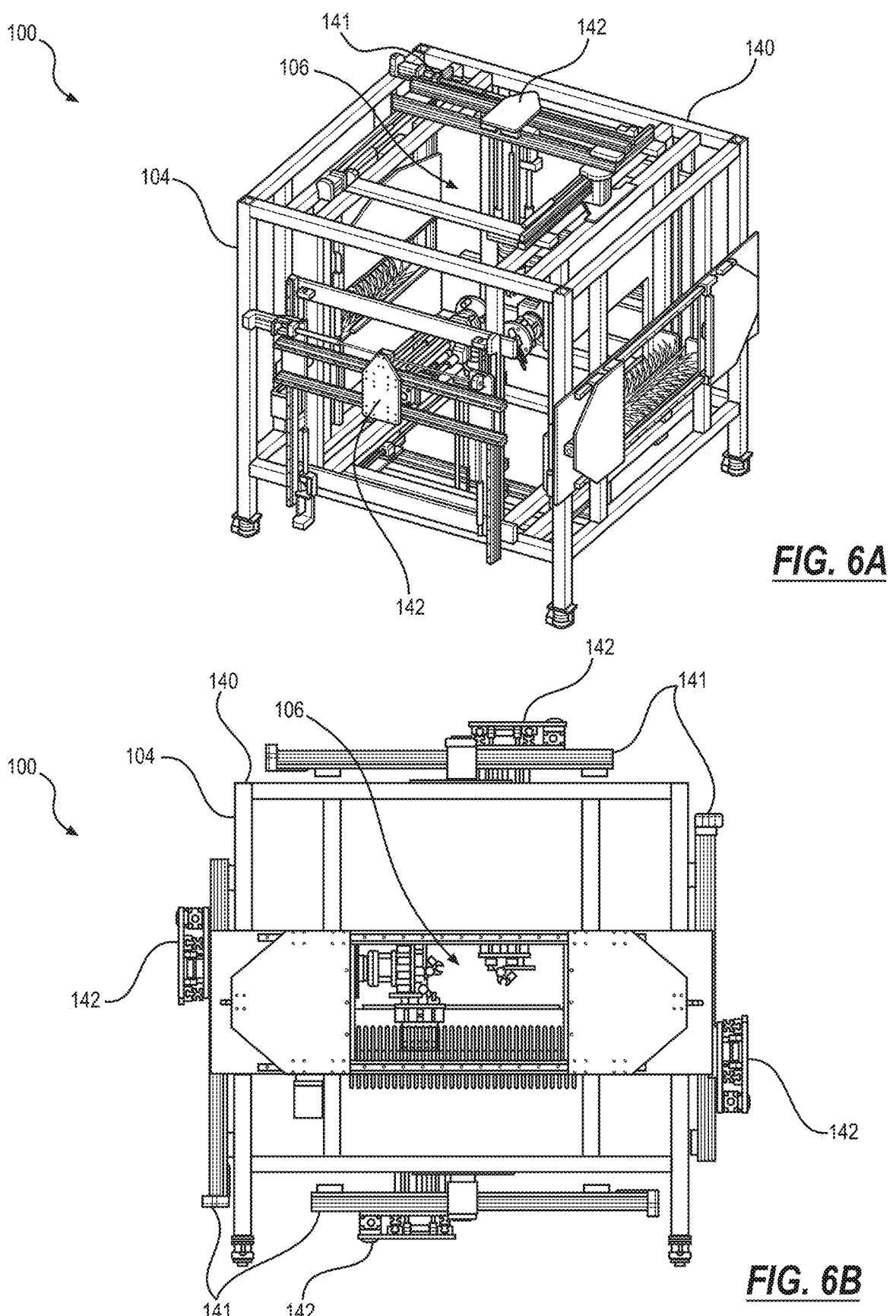
FIGS. 6A and 6B are schematic representations of one variation of the system.
Figure 7:
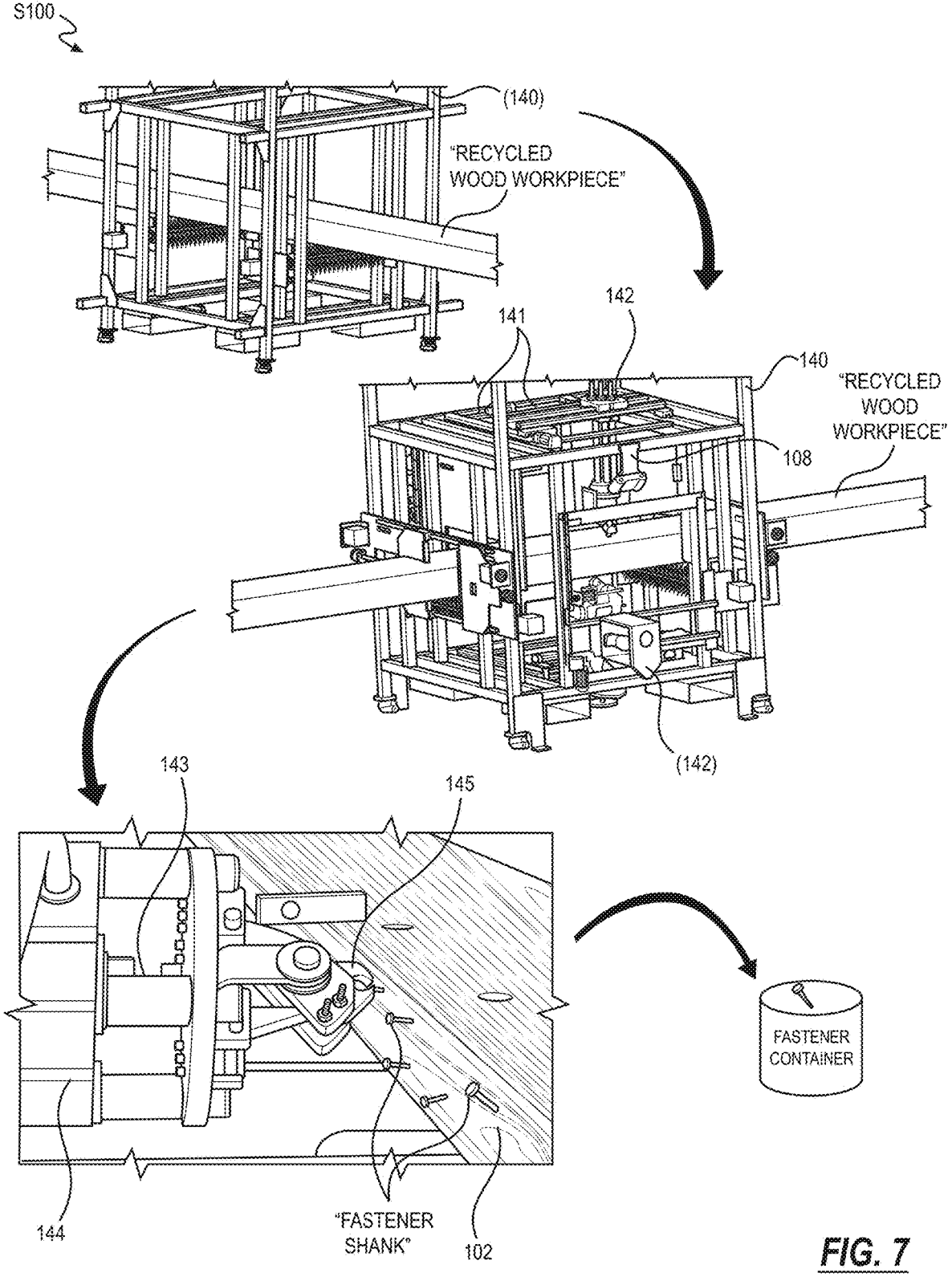
FIG. 7 is a schematic representation of one variation of the system.

As shown in FIGS. 6A, 6B, and 7, the fastener shank removal module 140 is arranged downstream of the induction module 130 and defines a work volume 106. The fastener shank removal module 140 includes: an optical sensor 108 facing the work volume 106; a stage supported by the chassis 104; and an extractor end effector 142. The extractor end effector 142 is supported and manipulated on the chassis 104 via the stage and includes a set of jaws 145 configured to engage and retain metal fasteners from the recycled wood workpiece and a jaw actuator 143 configured to actuate the set of jaws 145.

1.5 Metal Scan Module

As shown in FIG. 1, the metal scan module 150 is arranged on the chassis 104 within the threshold distance of the exit of the chassis 104 and includes a metal line scanner facing a scan volume and configured to detect metal fasteners within the recycled wood workpiece. The local controller 160 is further configured to: access a first metal scan of the recycled wood workpiece within the scan volume, captured by the metal line scanner; trigger the conveyance subsystem no to drive the recycled wood workpiece to a recycled wood workpiece pallet; and reset the conveyance subsystem no to an initial position at the entry of the chassis 104, in response to absence of metal fasteners detected in the first metal scan of the recycled wood workpiece.

2. Applications

Generally, the system 100 is configured to recycle used lumber (e.g., construction wood products) by removing metal fasteners from inbound recycled wood workpieces, including: resecting sections of metal fasteners proud of the surface of an inbound recycled wood workpiece; heating sections of individual metallic fasteners embedded in the inbound recycled wood workpiece in order to burn wood around these fastener sections; and to then autonomously extract these fastener sections from the inbound recycled wood workpiece.

In particular, the system 100 can include a fastener head removal module 120 that includes a set of laterally-offset cutters 121 (e.g., a pair of opposing bandsaws, or circular saws) supported and manipulated on the chassis 104 via a set of stages. As an inbound recycled wood workpiece is fed into the fastener head removal module 120, each cutter 121: resects sections (e.g., heads, upper shanks) of metal fasteners located proud of the surface of a corresponding side of the recycled wood workpiece; and/or skims a superficial layer of wood from the inbound recycled wood workpiece, thereby removing surface contaminants from the corresponding side of the recycled wood workpiece, revealing an inner layer of the recycled wood workpiece, and increasing a penetration depth of an inductor 133.

The fastener head removal module 120 or a downstream induction module 130: scans the inbound recycled wood workpiece with a set of imaging, depth, and/or color sensors 108; and implements computer vision techniques to detect metallic objects as metal fasteners (e.g., screws, straight nails, bent nails, staples) in the recycled wood workpiece. For example, the induction module can include a sensor 108 (e.g., an optical sensor) configured to record images of the inductor volume 131 occupied by a section of the inbound recycled wood workpiece and a local controller 160 configured to process and derive data from these images. The local controller 160 can: access an image of the inductor volume 131; extract a set of features representing a surface of the inbound recycled wood workpiece from the image; detect a reflective elliptical object embedded in the surface of the recycled wood workpiece and derive a location of the reflective elliptical object based on the set of features; identify the reflective elliptical object as a metal fastener occupying the location; and record the location of the metal fastener.

The induction module 130 can also selectively manipulate an inductor 133 around the inbound recycled wood workpiece to locally heat sections of metal fasteners embedded in the recycled wood workpiece by generating an electromagnetic field that couples to and heats these metals fasteners via induction heating. By heating a metal fastener directly via induction heating, the system 100 can burn back a local region of the inbound recycled wood workpiece around the metal fastener and along the full length of the metal fastener embedded in the inbound recycled wood workpiece, thereby reducing retention force of the metal fastener and decreasing a pull force necessary to withdraw the metal fastener from the inbound recycled wood workpiece (i.e., via a fastener shank removal module 140).

The system 100 also includes a fastener shank removal module 140—downstream of the induction module 130—that is configured to autonomously engage, retain, and remove these metal fasteners following burn-out by the induction module 130.

2.1 Imaging+Target Burn-Out Conditions

The local controller 160 is configured to: detect features in images captured by the sensor 108 (e.g., an optical sensor); based on these features, derive locations, presence, absence, and/or characteristics (e.g., sizes, diameters, or penetration depths) of metal fasteners in the recycled wood workpiece; record locations on the recycled wood workpiece occupied by these metal fasteners; and define a toolpath for the inductor 133 as the inbound recycled wood workpiece moves into the induction module 130.

The local controller 160 can also autonomously define target burn-out temperatures of the metal fasteners and/or regions of the recycled wood workpiece around these metal fasteners and burn-out durations based on characteristics of these metal fasteners, such as: higher burn-out temperatures and/or durations for metal fasteners with greater penetration depths; higher burn-out temperatures and/or durations for larger-diameter metal fasteners; and higher burn-out temperatures and/or durations for screws than nails.

2.2 Induction Heating

The system 100 can execute an induction cycle at the induction module 130 to heat metal fasteners occupying a recycled wood workpiece via induction heating, such as locally heating or burning the recycled wood workpiece, around each metal fastener, which may cause wood material in the recycled wood workpiece to become charred and shrink or retract from each metal fastener, thereby loosening these metal fasteners and/or reducing pull force or torque necessary to remove these metal fasteners from the recycled wood workpiece by downstream fastener shank removal modules 140.

The system 100 can further execute the induction cycle at the induction module 130 to heat or burn the recycled wood workpiece around each metal fastener, which may cause charred marks on the recycled wood workpiece and thus enable the optical sensor 108 of a downstream fastener shank removal module 140 to accurately and repeatably identify these charred marks corresponding to metal fasteners for removal.

2.2.1 Induction Cycle: Surface Temperatures

Once the recycled wood workpiece enters the inductor volume 131, the local controller 160 can initiate an induction cycle, including: triggering the driver 134 to supply alternating current to the inductor 133, thereby generating an electromagnetic field within the inductor volume 131; magnetically coupling the inductor 133 to a metal fastener embedded in the recycled wood workpiece; and heating the metal fastener via induction heating. During the induction cycle, the local controller 160 can further: locate the inductor proximal a next metal fastener embedded in the recycled wood workpiece; identify a temperature of the previous metal fastener and/or a surface temperature of a nearby region of the recycled wood workpiece based on a signal (e.g., a thermal image) from the sensor 108 (e.g., a temperature sensor); and, in response to the temperature and/or the surface temperature falling below a threshold temperature, trigger the driver 134 to increase power output to the inductor 133 for the next metal fastener.

Alternatively, in response to the temperature and/or the surface temperature exceeding the threshold temperature, the local controller 160 can trigger the driver 134 to reduce power output to the inductor 133 to avoid ignition of the next metal fastener embedded in the recycled wood workpiece.

2.3 Recyclability+Sustainability

Therefore, the system 100 can process used recycled wood workpieces (e.g., wood products)—such as joists, beams, columns, dimensional or non-dimensional lumber, or plywood sheet goods—populated with metallic objects: to identify metallic objects as metal fasteners; to characterize characteristics of metal fasteners (e.g., sizes, dimensions, penetration depths); to derive and store locations of metal fasteners; and to detect, heat, and remove metal fasteners (e.g., straight nails, bent nails, staples, retainer nails, screws), and other metallic objects embedded in sections of these wood products.

Thus, the system 100 is configured to recycle wood products in order to enable more sustainable forest management and reduce deforestation, pollution, greenhouse gases, and wood product waste resulting from construction.

The system 100 is described herein as processing recycled wood workpieces (e.g., linear construction timber), such as dimensional or non-dimensional 2"×4" or 2"×6" recycled wood workpieces. However, the system 100 can additionally or alternatively process recycled wood workpieces such as: joists; rafters; wood I-beams; posts, headers; laminated timber; finger-jointed timber; plywood sheet; oriented strandboard sheet; and/or MDF sheet; etc.

3. Method

Figure 8:
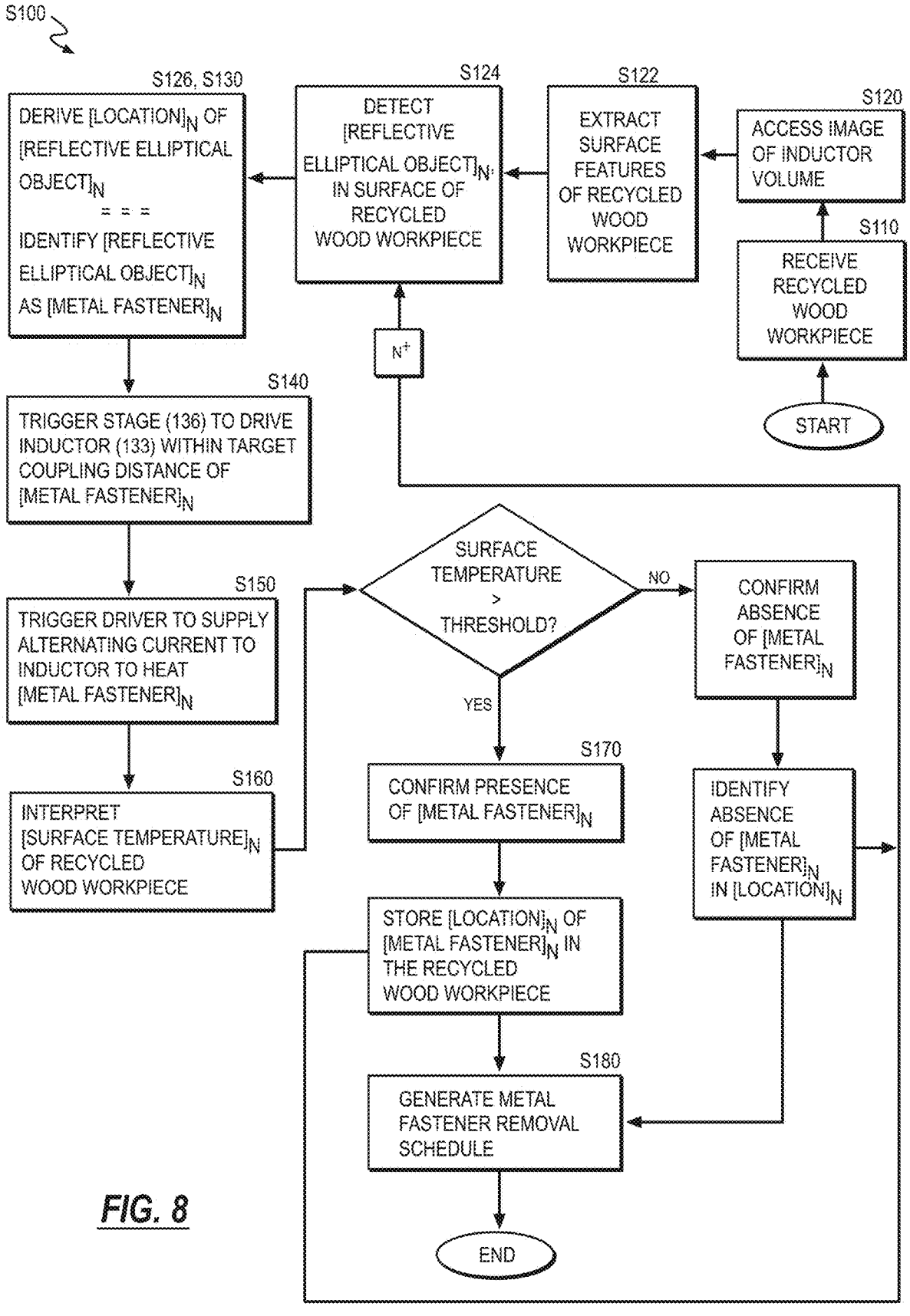
FIG. 8 is a flowchart representation of a method.

As shown in FIG. 8, a method S100 for removing metal fasteners from a recycled wood workpiece comprises: receiving a recycled wood workpiece in an inductor volume in Block S110; accessing an image of the inductor volume, the image recorded by an optical sensor facing the inductor volume in Block S120; extracting a set of features representing a surface of the recycled wood workpiece from the image in Block S122; detecting a first reflective elliptical object embedded in the surface of the recycled wood workpiece based on the set of features in Block S124; deriving a first location of the first reflective elliptical object based on the set of features in Block S126; and identifying the first reflective elliptical object as a first metal fastener occupying the first location in Block S130.

The method S100 further includes: triggering the stage to drive an inductor 133, arranged within the inductor volume, within a target coupling distance of the first location of the first metal fastener in Block S140; triggering a driver to supply a target alternating current to the inductor to heat the first metal fastener via induction heating and to reduce retention of the first metal fastener by the recycled wood workpiece in Block S150; interpreting a first surface temperature of the recycled wood workpiece, proximal the first location, based on a first signal output by a temperature sensor facing an output side of the induction module in Block S160; and, in response to the first surface temperature exceeding a threshold temperature, confirming presence of the first metal fastener occupying the first location in Block S170.

The method S100 also includes generating a metal fastener removal schedule specifying removal of the first metal fastener from the recycled wood workpiece at the first location for execution by a metal fastener removal module in Block S180.

4. Chassis

The chassis 104: defines a work volume 106 and includes an exo-structure arranged about each fastener head removal module 120, each induction module 130, and each fastener shank removal module 140. The exo-structure is configured to: support a stage and a set of cutters 121 of the fastener head removal module 120; support an inductor stage 136 and an inductor 133 of the induction module 130; and support the stage and the extractor end effector 142 of a fastener shank removal module 140.

In one variation, the chassis 104 includes: a first set of lateral clamps to constrain lateral sides of the recycled wood workpiece at an input side (e.g., entry) of the chassis 104; a first set of vertical clamps to constrain vertical sides of the recycled wood workpiece at the input side of the chassis 104; a second set of lateral clamps to constrain lateral sides of the recycled wood workpiece at an output side (e.g., exit) of the chassis 104; and a second set of vertical clamps to constrain vertical sides of the recycled wood workpiece at the output side of the chassis 104.

5. Conveyance Subsystem

The conveyance subsystem 110 is configured to receive the recycled wood workpiece populated with metal fasteners and is configured to constrain a section of the recycled wood workpiece within the work volume 106 of a fastener shank removal module 140. The conveyance subsystem 110 also includes a set of (e.g., two) rollers arranged on each side of a longitudinal axis of the system 100 and cooperate to engage and position a recycled wood workpiece along the longitudinal axis of the system 100.

In another implementation, the conveyance subsystem 110 includes a set of rollers: coupled to an input side of a lateral axis of the induction module 130; and configured to constrain lateral sides of the recycled wood workpiece at the input side. The conveyance subsystem 110 further includes a set of output rollers: coupled to an output side of the lateral axis of the induction module 130; and configured to roll across lateral sides of the recycled wood workpiece at the output side to tamp burning wood material, in the recycled wood workpiece, around each metal fastener in the recycled wood workpiece.

Additionally, the conveyance subsystem 110 includes: a set of (e.g., two, three, four) adjustable clamps configured to receive and retain the recycled wood workpiece. For example, the conveyance subsystem 110 can include: a set of lateral clamps to constrain lateral sides of the recycled wood workpiece at the input side of the chassis 104; and a set of vertical clamps to constrain vertical sides of the recycled wood workpiece at the input side of the chassis 104.

In this implementation, the input roller, the output roller, and the set of (e.g., two, four) adjustable clamps cooperate to receive and retain the recycled wood workpiece—in six degrees of freedom—during the processing cycle. Additionally, the set of rollers and the set of adjustable clamps cooperate to: receive and retain the recycled wood workpiece during the induction cycle; permit the induction module 130 to access and heat metal fasteners fully or embedded in the recycled wood workpiece occupying the inductor volume 131 during an induction cycle; and permit fastener shank removal modules 140 to access and remove metal fasteners—embedded in surfaces of the recycled wood workpiece occupying the work volume 106—during a metal fastener removal cycle.

6. Fastener Head Removal Module

The fastener head removal module 120 includes: a set of rollers; a left stage 122 coupled to the chassis 104; a right stage 122 coupled to the chassis 104 and opposite the left stage 122; a sensor 108; a left cutter 121 supported and manipulated by the left stage 122; a right cutter 121 supported and manipulated by the right stage 122; and a local controller 160.

6.1 Rollers+Standoffs

The first roller 123: is coupled to an input side of the fastener head removal module 120; extends parallel to and laterally offset from a longitudinal axis of the fastener head removal module 120; and includes a first set of standoffs 124. The first set of standoffs 124: extend radially from the first roller; define a nominal length greater than a nominal metal fastener length; and are configured to locate a first side of the recycled wood workpiece at the input side.

The second roller 125: is coupled to the input side of the fastener head removal module 120; extends parallel to and laterally offset from the longitudinal axis of the fastener head removal module 120 opposite the first roller; and includes a second set of standoffs. The second set of standoffs: extend radially from the second roller; define the nominal length greater than the nominal metal fastener length; and are configured to locate a second side of the recycled wood workpiece, opposite the first side, at the input side.

6.2 Left Cutter+Left Stage+Left Cutter Actuator

The left cutter 121 is arranged within the work volume 106 and is configured to: resect heads from shanks of metal fasteners embedded within a first side of the recycled wood workpiece; remove surface contaminants from the first side of the recycled wood workpiece; and/or remove a surface layer of wood material from the first side of the recycled wood workpiece to reveal an inner layer of the recycled wood workpiece.

The left stage 122 is supported by the chassis 104 and configured to manipulate the left cutter 121 over a range of lateral positions within the work volume 106 of the fastener head removal module 120.

The left cutter actuator 126 is coupled to the left cutter 121 and configured to actuate the left cutter 121 over a range of longitudinal positions.

6.3 Right Cutter+Right Stage

The right cutter 121 is arranged within the work volume 106 adjacent the first cutter 121 and configured to: resect heads from shanks of metal fasteners embedded within a second side, opposite the first side, of the recycled wood workpiece; remove surface contaminants from the second side of the recycled wood workpiece; and/or remove the surface layer of wood material from the second side of the recycled wood workpiece to reveal the inner layer of the recycled wood workpiece.

The right stage 122 is supported by the chassis 104 and configured to manipulate the right cutter 121 over a range of lateral positions within the work volume 106 of the fastener head removal module 120.

The right cutter actuator 126 is coupled to the right cutter 121 and configured to actuate the right cutter 121 over a range of longitudinal positions to maintain an offset distance between the left cutter 121 and the right cutter 121 proportional to a dimension of the recycled wood workpiece.

6.4 Other Cutters

In one variation, the fastener head removal module includes a set of cutters 121 arranged within the work volume 106 and configured to: resect heads from shanks of metal fasteners embedded within all sides of the recycled wood workpiece; remove surface contaminants from all sides of the recycled wood workpiece; and/or remove a surface layer of wood material from all sides of the recycled wood workpiece to reveal an inner layer of the recycled wood workpiece. The fastener head removal module further includes a set of actuators 126: coupled to a corresponding cutter 121 in the set of cutters 121; and configured to actuate the corresponding cutter 121 over a range of longitudinal positions.

6.5 Sensors

The fastener head removal module 120 (upstream of the inductor) can include a sensor 108 facing the work volume

106 and configured to output signals representing a dimension (e.g., a width) of the recycled wood workpiece within the work volume 106.

In one variation, the fastener head removal module includes a sensor 108 facing the work volume 106 and configured to output signals representing presence or absence of metal fasteners embedded in the recycled wood workpiece.

6.6 Local Controller

The local controller 160 is coupled to actuators and sensors 108 within the fastener head removal module 120 and executes methods and techniques described below to remove heads of metal fasteners proud of the recycled wood workpiece, manipulate a speed of the conveyor according to signals from the sensor 108, remove surface contaminants, and/or remove a top surface layer from the recycled wood workpiece to reveal shanks of these metal fasteners in an inner layer of the recycled wood workpiece.

In one variation, the local controller 160: detects presence of a set of metal fasteners embedded in the recycled wood workpiece based on a signal from the sensor 108; and, in response to detecting presence of the set of metal fasteners, reduces a speed of the conveyance subsystem 110 to enable the set of cutters to remove heads of the set of metal fasteners. Alternatively, the local controller 160: detects absence of a metal fastener embedded in the recycled wood workpiece based on a signal from the sensor 108; and, in response to detecting absence of the metal fastener, increases a speed of the conveyance subsystem 110 to move the recycled wood workpiece toward the induction module 130.

7. Induction Module

As described above, the induction module 130 includes: a conveyor; a sensor 108; an inductor 133; an inductor stage 136; and a local controller 160.

7.1 Inductor+Inductor Stage

The induction module 130 includes a driver 134 electrically coupled to a power source and an inductor 133 electrically coupled to the driver 134. The driver 134 is configured to supply alternating current to the inductor to generate an electromagnetic field that couples to and heats a metal fastener via induction heating, thereby reducing retention of the metal fastener by the recycled wood workpiece.

The inductor stage 136 (e.g., a multi-axis stage) is configured to locate the inductor 133 within a target coupling distance of metal fasteners embedded in the recycled wood workpiece. In one variation, the inductor stage 136 includes a follower 137 configured to: ride over a face of the recycled wood workpiece along a longitudinal axis of the induction module 130; and offset the inductor 133 above the face of the recycled wood workpiece by a target coupling distance.

7.1.1 Conductive Coil

In one implementation, the inductor 133 includes a conductive coil (e.g., a copper wire coil, an aluminum wire coil) supported and manipulated by the inductor stage 136 configured to generate an electromagnetic field within the inductor volume 131 when driven with an alternating current supplied by the driver 134.

In one variation, the induction module 130 includes a shield of a ferrous material (e.g., ferrite, a solid metal, a powdered metal) configured to increase or focus the electromagnetic field, generated by the conductive coil, toward a section of the recycled wood workpiece occupying the inductor volume 131. In this implementation, the conductive coil is arranged about (i.e., encircling) the shield; configured to generate an electromagnetic field within the inductor volume 131 when the conductive coil is driven with an alternating current by the driver 134; and thus configured to heat a metal fastener embedded in the recycled wood workpiece—occupying the inductor volume 131—by induction heating.

For example, the induction module 130 can include a shield (e.g., a carbon steel shield) that defines a cavity (e.g., an open air core) defining an entry and an exit of the induction module 130. Further, the cavity defines a minor cross-sectional width: greater than a minimum cross-sectional width of the recycled wood workpiece; and less than a minimum cross-sectional width of the conductive coil. The shield is configured to house a section of the recycled wood workpiece from the entry of the induction module 130 and to the exit of the induction module 130. The shield is further configured to increase or focus the electromagnetic field, generated by the conductive coil, toward a metal fastener embedded in the section of the recycled wood workpiece occupying the inductor volume 131.

In another variation, the conductive coil can include a multi-loop helical conductive coil (e.g., a copper wire coil, an aluminum wire coil) supported by the chassis 104, encircling the inductor volume 131, and defining an air core. In this variation, the conductive coil leverages air within the air core to receive and store alternating current from the driver 134 and then convert this alternating current into an electromagnetic field within the inductor volume 131. The conductive coil is further configured to heat a metal fastener embedded in the recycled wood workpiece by induction heating. In this variation, the conductive coil maintains the electromagnetic field within the inductor volume 131 via the air core.

In yet another variation, the induction module 130 includes a shield of a ferrous material (e.g., a solid metal, a powdered metal) configured to increase or focus the electromagnetic field, generated by the conductive coil, toward a section of the recycled wood workpiece occupying the inductor volume 131. In this variation, the conductive coil includes a slit conductive coil (e.g., a pancake coil) arranged along a longitudinal axis of the shield. Further, the pancake coil is configured to generate an electromagnetic field within the inductor volume 131, when the pancake coil is driven with an alternating current by the driver 134, to heat a metal fastener embedded in the recycled wood workpiece via induction heating.

However, the induction module 130 can include a shield of any other ferrous material and the conductive coil can include any other material and can be of any other form. Further, the shield and the conductive coil can be supported by the chassis 104 in any other way.

7.1.2 Driver

The driver 134: is electrically coupled to a power source and the inductor 133; and is configured to selectively supply alternating current to the inductor 133, responsive to a trigger from the local controller 160, during an induction cycle (e.g., upon entry of a section of the recycled wood workpiece into the inductor volume 131).

In one implementation, the driver 134 is configured to selectively couple the inductor 133 to a power supply in a single direction to polarize the inductor 133 in this single direction only. For example, the driver 134 can include a power transistor, and the local controller 160 can selectively activate and deactivate the driver 134 to polarize the inductor 133, thereby causing the inductor 133 to generate an electromagnetic field and heat a metal fastener embedded in a section of the recycled wood workpiece occupying the inductor volume 131 via induction heating.

However, the induction module 130 can include a driver 134 or other component of any other type to selectively supply electrical current to the inductor 133.

7.3 Sensors

The induction module 130 further includes a set of (e.g., two, three) sensors 108 coupled to the induction module 130 and facing the inductor volume 131. In one implementation, the set of sensors 108 can include an optical sensor (e.g., an RGB camera, a one-dimensional depth sensor, a three-dimensional camera) and a proximity sensor (e.g., a conductive sensor, an inductive sensor, a position sensor) arranged at the input side of the induction module 130 (upstream of the inductor 133); and/or a temperature sensor (e.g., an infrared sensor, a thermal camera, a line scanner) arranged at the output side of the induction module 130 (downstream of the inductor). The local controller 160 can interpret characteristics of metal fasteners (e.g., locations, position, orientation, dimension) and the recycled wood workpiece (e.g., surface temperature) from signals output by the sensor 108 or the set of sensors 108.

In one variation, the sensor 108 includes a temperature sensor (e.g., a pyrometer, an infrared sensor, a thermocouple, a resistance temperature detector, a thermal camera) coupled to the chassis 104 (upstream of the inductor 133) facing the inductor volume 131, and configured to output a signal corresponding to a) a temperature of a metal fastener embedded in a recycled wood workpiece or b) a surface temperature of wood material, in the recycled wood workpiece, around a metal fastener during an induction cycle. The local controller 160 can then monitor a temperature of each metal fastener occupying the inductor volume 131 and/or a surface temperature of nearby regions of the recycled wood workpiece based on signals (e.g., thermal images) from the temperature sensor; and trigger the driver 134 to increase or reduce power output to the inductor 133 for a next metal fastener embedded in the recycled wood workpiece in order to a) achieve target burn-out temperatures at and/or around the next metal fastener and b) avoid ignition of the wood material, in the recycled wood workpiece, around the next metal fastener.

However, the set of sensors 108 can include any other type of sensor and output data in any other format.

7.4 Multiple Inductors Per Inductor Volume

In one variation, the induction module 130 can include multiple independently-operable instances of the inductor 133 such as: two, three, or four instances of the inductor 133 distributed radially about the induction module 130 in the inductor volume 131; and that cooperate to heat metal fasteners from all four sides of a recycled wood workpiece occupying the inductor volume 131 via induction heating.

For example, the induction module 130 can include a set of (e.g., two) inductors 133 that cooperate to heat metal fasteners embedded in two sides of a recycled wood workpiece occupying the inductor volume 131. The first inductor 133 faces a first side of the recycled wood workpiece within the inductor volume 131 and is configured to generate an electromagnetic field that couples to and heats a first metal fastener embedded in the first side of the recycled wood workpiece via induction heating and to reduce retention of the first metal fastener by the recycled wood workpiece. The second inductor 133 faces a second side orthogonal to the first side of the recycled wood workpiece within the inductor volume 131; and is configured to generate a second electromagnetic field that couples to and heats a second metal fastener—burning wood material, in the recycled wood workpiece, around the second metal fastener to reduce retention of the second metal fastener by the recycled wood workpiece—via induction heating. The induction module 130 further includes a second inductor stage 136 configured to locate the second inductor 133 adjacent the second location of the second metal fastener.

7.5 Local Controller

The local controller 160 is coupled to actuators and sensors 108 within the induction module 130 and executes methods and techniques described below to heat metal fasteners embedded in a recycled wood workpiece during an induction cycle.

8. Fastener Shank Removal Module

The fastener shank removal module 140 is arranged downstream of the induction module 130 and includes: an optical sensor 108 facing the work volume 106; an extractor end effector 142; a stage (e.g., a multi-axis stage); a set of actuators; and a local controller 160. The extractor end effector 142: is supported and manipulated on the chassis 104 via the stage; and includes a set of jaws 145 configured to engage and retain metal fasteners from the recycled wood workpiece and a jaw actuator 143 configured to actuate the set of jaws 145. The stage is configured to locate the extractor end effector 142 adjacent the recycled wood workpiece. The local controller 160 can access and execute a fastener removal schedule to remove metal fasteners from the recycled wood workpiece.

In one implementation, as described in U.S. patent application Ser. No. 18/117,240, filed on 3 Mar. 2023, the extractor end effector 142 includes: a bearing plate; a vertical stage arranged on the multi-axis stage and configured to support the bearing plate, advance the bearing plate toward a metal fastener in a recycled wood workpiece occupying the work volume 106, and retract the bearing plate to withdraw the metal fastener from the recycled wood workpiece; and a jaw actuator 143 arranged on the vertical stage, coupled to a set of jaws 145 and configured to close the set of jaws 145 to engage the set of jaws 145 against a metal fastener and to open the set of jaws 145 to release the metal fastener from the set of jaws 145.

9. Metal Scan Module

The metal scan module 150 is configured to capture a sequence of metal scan data of the recycled wood workpiece as the local controller 160 of a fastener shank removal module 140 drives the recycled wood workpiece past the metal scanner during a last segment of the processing cycle. Alternatively, the metal scan module 150 is configured to capture a set of metal scans of the recycled wood workpiece as the machine (e.g., forklift) or a human operator drives the recycled wood workpiece from a fastener shank removal module 140 to the metal scan module 150.

In one implementation, the metal scan module 150 includes a one-dimensional metal line scanner arranged over (or facing laterally across) the recycled wood workpiece. In this implementation, the metal scanner can transmit an electromagnetic field into the recycled wood workpiece to detect any metal fasteners (e.g., metal objects) that went undetected during previous segments of the processing cycle. Then, in response to absence of metal fasteners in the recycled wood workpiece, the primary controller 170 can trigger the conveyance subsystem 110 to drive the recycled wood workpiece forward to a recycled wood workpiece pallet and reset the conveyance subsystem 110 to a home position.

Alternatively, in response to detecting a metal fastener and/or a set of metal fasteners in the recycled wood workpiece, the primary controller 170 can trigger the conveyance subsystem 110 to drive the recycled wood workpiece forward to a recycled wood workpiece receival pallet to resect a section of the recycled wood workpiece containing the metal fastener and/or to restart the processing cycle.

In one variation, the local controller 160 of a fastener shank removal module 140 can generate a resection schedule to resect a section of the recycled wood workpiece containing the metal fastener. For example, in response to absence of correlation between an external feature—detected in an image captured by an optical sensor 108—of the section of the recycled wood workpiece to an internal feature in the virtual model, the primary controller 170 can: define a bounding region containing the external feature in the image; flag the bounding region with a resection flag; generate a resection schedule to resect a subsection of the recycled wood workpiece corresponding to the bounding region in the image; and assign the resection schedule to a corresponding fastener shank removal module 140 to resect the subsection of the recycled wood workpiece.

10. Primary Controller

The primary controller 170 is coupled to actuators and sensors 108 within the system 100 and executes methods and techniques described below to process a recycled wood workpiece during a processing cycle.

11. Processing Cycle

In one implementation, at the start of a processing cycle, a human operator or a machine (e.g., a forklift) loads a recycled wood workpiece onto the conveyance subsystem 110 and the primary controller 170 can then actuate the set of adjustable clamps to receive and retain the recycled wood workpiece. The primary controller 170 then initiates the processing cycle and triggers the conveyor to drive the recycled wood workpiece toward the fastener head removal module 120.

11.1 Normalize Surface of Recycled Wood Workpiece+ Fastener Head Removal

In one implementation, once a section of the recycled wood workpiece approaches an input side of the fastener head removal module 120, the local controller 160 calculates a target position of the left stage 122 and the right stage 122 within a local coordinate system of the fastener head removal module 120. The local controller 160 triggers the left and right stages 122 to drive the left cutter 121 and the right cutter 121 to these target positions to maintain an offset distance between the left cutter 121 and the right cutter 121 proportional to a dimension of the recycled wood workpiece.

In one variation, during the processing cycle, the local controller 160 can: receive signals from a linear position sensor 108 facing the work volume 106; interpret a dimension of the recycled wood workpiece occupying the work volume 106; and trigger the cutter actuator 126 to drive the first cutter 121 to a target position in order to offset the first cutter 121 from the second cutter 121 proportional to the width of the recycled wood workpiece and vice versa.

For example, the first cutter 121 is arranged in a lateral position within the work volume 106. The local controller 160 is configured to: interpret a width of the recycled wood workpiece occupying the work volume 106 based on a signal output by the sensor 108; calculate a second lateral position of the second cutter 121 to offset the second cutter 121 from the first cutter 121 by a distance proportional to the width of the recycled wood workpiece based on the first lateral position of the first cutter 121; and trigger the first cutter actuator 126 to drive the left stage 122 to the second lateral position.

The local controller 160 then triggers a set of actuators (e.g., servo motors) to drive sets of standoffs: to locate sides of the recycled wood workpiece at the input side of the fastener head removal module 120 and to drive the recycled wood workpiece between the left and right cutters 121. The local controller 160 can then activate the left and right cutters 121: to remove heads from shanks of metal fasteners embedded within (e.g., protruding from, proud of) sides of the recycled wood workpiece; to remove surface contaminants for sides of the recycled wood workpiece; and to remove a surface layer of wood material from sides of the recycled wood workpiece to reveal an inner layer of the recycled wood workpiece.

12. Induction Cycle

At the start of an induction cycle, the primary controller 170 can trigger the conveyance subsystem 110 to feed the recycled wood workpiece toward the entry (e.g., input side) of the induction module 130. Once a section of the recycled wood workpiece enters the inductor volume 131 of the induction module 130, the local controller 160 can then initiate the induction cycle.

The system 100 can execute the induction cycle at the induction module 130 to heat metal fasteners occupying the recycled wood workpiece via induction heating, thereby locally heating or burning the recycled wood workpiece around each metal fastener, which may cause wood in the recycled wood workpiece to shrink or retract from each metal fastener, thereby loosening these metal fasteners and/ or reducing pull force or torque necessary to remove these metal fasteners from the recycled wood workpiece by downstream fastener shank removal modules 140.

12.1 Metal Fastener Detection

The local controller 160 can access an image captured by an optical sensor 108, arranged in the induction module 130 and facing the inductor volume 131, detect metallic objects (e.g., shiny objects, reflective elliptical objects) in the image, and derive characteristics of these metallic objects. Accordingly, the local controller 160 can identify each metallic object as a metal fastener embedded in the recycled wood workpiece.

In one implementation, the optical sensor 108 can capture an image of the inductor volume 131 and transmit this image to the local controller 160. The local controller 160 can: receive the image from the optical sensor 108; detect a region of the image depicting an inner layer of a side of the recycled wood workpiece; and extract a set of features representing characteristics of this side of the recycled wood workpiece from the region of the image. Based on the set of features, the local controller 160 can: detect a reflective elliptical object embedded in the inner layer; and derive a location of the reflective elliptical object. The local controller 160 can then: identify the reflective elliptical object as a possible metal fastener occupying the location and embedded in the inner layer of the recycled wood workpiece; and annotate a subregion of the image, depicting the reflective elliptical object, as a possible metal fastener.

In another implementation, the local controller 160 can: receive an image from the optical sensor 108; detect a region of the image depicting a top surface layer of a side of the recycled wood workpiece; and extract a set of features representing characteristics (e.g., a color value, a size, geometry) of this side of the recycled wood workpiece from the region of the image. Based on the set of features, the local controller 160 can: detect a metallic object embedded in the top surface layer; and derive a location of the metallic object. The local controller 160 can then: identify the metallic object as a possible metal fastener occupying the location and embedded in the inner layer of the recycled wood workpiece; and annotate a subregion of the image, depicting the metallic object, as a possible metal fastener.

The local controller 160 can repeat these methods and techniques for each other image, for each other side of the recycled wood workpiece, and for each other object to identify possible metal fasteners in the recycled wood workpiece.

12.1.1 Manual Target Burn-Out Durations

Generally, prior to executing an induction cycle, the operator can define a target burn-out temperature and/or a target burn-out duration for each type of metal in a metal fastener list and interface with a user portal (or "operator portal") to upload this metal fastener list.

In one implementation, the operator can upload this metal fastener list to the primary controller 170 via an operator portal. The primary controller 170 can then receive this metal fastener list, annotated with target burn-out temperatures and metal types, and store this metal fastener list in a burn-out database. The local controller 160 of the induction module 130 can then access the burn-out database prior to executing an induction cycle.

For example, the primary controller 170 can trigger the conveyance subsystem 110 to drive an inbound recycled wood workpiece (e.g., a two-inch by four-inch stud) toward the input side of the induction module 130. The inbound recycled wood workpiece is: populated with a set of framing nails at a proximal end; populated with a set of framing nails on a distal end opposite the proximal end; and populated with an array of drywall screws arranged along a longitudinal axis of the recycled wood workpiece and longitudinally offset by a pitch distance. The operator may define a first target burn-out duration for framing nails and a second target burn-out duration for drywall screws and upload these target burn-out durations to the operator portal. The local controller 160 can: access the burn-out database; retrieve a 2×4 metal fastener list associated with an average target burn-out duration; and set the target burn-out duration for a continuous induction cycle to heat both sets of framing nails and the array of drywall screws.

Therefore, an operator may interface with an operator portal to manually review an image of the inductor volume 131 and define a target burn-out temperature and/or a target burn-out duration for each metal fastener embedded in a recycled wood workpiece prior to execution of an induction cycle. The primary controller 170 can then store these target burn-out temperatures and/or target burn-out durations in a burn-out database.

12.1.2 Autonomous Target Burn-Out Durations

Furthermore, the local controller 160 can characterize a dimension (e.g., a diameter, a width, a size) of each possible metal fastener and autonomously set a target burn-out duration for each metal fastener proportional to a corresponding size of each metal fastener.

In one variation, the local controller 160 characterizes a size of a shank of the possible metal fastener depicted in an image, captured by an optical sensor 108 upstream of the inductor 133, and sets a target burn-out duration proportional to the size of the shank of the possible metal fastener embedded in the inner layer of the recycled wood workpiece. For example, the local controller 160 can: access an annotated image of the inductor volume 131 from the optical sensor 108; detect a possible metal fastener, such as a framing nail, embedded in a side of the recycled wood workpiece in the annotated image; extract a set of features representing a shank of the framing nail in the annotated image; characterize a size, such as a cross-sectional area, of the shank of the framing nail based on the set of features; derive a diameter of the shank of the framing nail from the size; set a target-burn out duration proportional to the size; and label the set of features, in the annotated image, with the target burn-out duration.

In another variation, the local controller 160 interprets a size of a shank of the possible metal fastener from a signal output by a proximity sensor 108 and sets a target burn-out duration proportional to the size of the shank of the possible metal fastener embedded in the inner layer of the recycled wood workpiece. For example, the proximity sensor 108 can transmit a signal, representing sizes of metal fasteners within a side of the recycled wood workpiece occupying the inductor volume 131, to the local controller 160. Based on the signal, the local controller 160 can: interpret a first size of a first possible metal fastener based on the signal; interpret a second size of a second possible metal fastener, the second size of the second possible metal fastener corresponding to (e.g., matching) the first size of the first possible metal fastener; and set a target burn-out duration for this side of the recycled wood workpiece proportional to the first size of the first metal fastener.

Therefore, the system 100 can autonomously interpret a size of a possible metal fastener embedded in the recycled wood workpiece and set a target burn-out duration for the possible metal fastener, proportional to the size, in (near) real-time and thereby, reduce computational resources to store and maintain a burn-out database.

12.2 Induction Cycle: Continuous Speed

In one implementation, the primary controller 170 triggers the conveyance subsystem 110 to drive the recycled wood workpiece into the inductor volume 131 at a continuous speed in a forward direction along a longitudinal axis of the induction module 130. The local controller 160 can then drive the inductor 133 at the continuous speed in the forward direction for a target burn-out duration to maintain the inductor 133 proximal a location of a possible metal fastener in order to generate an electromagnetic field to heat the possible metal fastener and thus, reduce retention of the possible metal fastener by the recycled wood workpiece.

For example, the local controller 160 interprets a first location of a first nail embedded in a distal end of the recycled wood workpiece and a second location of a second nail embedded in a proximal end of a recycled wood workpiece, opposite the distal end, based on a signal output by a position sensor 108. The local controller 160 can then: trigger the conveyor to drive the recycled wood workpiece into the inductor volume 131 at a first speed in a forward direction along a longitudinal axis of the induction module 130; and trigger the inductor stage 136 to drive the inductor 133 at the first speed in the forward direction for a target burn-out duration to maintain the inductor 133 proximal (e.g., within a target coupling distance of) the first location of the first nail embedded in the proximal end of the recycled wood workpiece.

During the target burn-out duration, the local controller 160 can trigger the driver 134 to supply alternating current to the inductor 133 to generate an electromagnetic field to couple to and heat the first nail in the section of the recycled wood workpiece. Then, in response to termination of the target burn-out duration for the first nail, the local controller 160 can traverse the inductor 133 in a backward direction to relocate the inductor 133 proximal (e.g., within a target coupling distance of) the second location of the second nail embedded in the proximal end of the recycled wood workpiece for a next target burn-out duration.

12.3 Induction Cycle: Discontinuous Speed+Pulse Modulation

In one implementation, during the induction cycle, the local controller 160 can trigger the driver 134 to transmit alternating current to the inductor 133 in a single pulse in the form of a square of sinusoidal waveform for an interval of time, thereby inducing an electromagnetic field during this interval of time. The inductor 133 can then generate an electromagnetic field to couple to and heat a possible metal fastener and/or a set of possible metal fasteners embedded in the recycled wood workpiece occupying the inductor volume 131 via induction heating. At the conclusion of this pulse, the electromagnetic field can decay, thereby reducing the heat from the inductor 133 within the inductor volume 131. The primary controller 170 can then trigger the conveyance subsystem no to move this section of the recycled wood workpiece toward a fastener shank removal module 140 to remove the possible metal fastener and/or the set of burn-out database and selects a metal type, a target burn-out temperature, and a target burn-out duration for a set of possible metal fasteners from this section of the recycled wood workpiece and initiate a next induction cycle.

Additionally or alternatively, in between induction cycles, the local controller 160 can trigger the driver 134 to output half the amount of alternating current to the inductor 133 for a set of pulses, each pulse in the form of a square or sinusoidal waveform, to detect presence of a possible metal fastener within the inductor volume 131. Then, responsive to detecting presence of a possible metal fastener within the inductor volume 131, the local controller 160 can initiate a next induction cycle and trigger the driver 134 to output alternating current to the inductor 133 in the single pulse for a next interval of time.

12.4 Induction Cycle: Multiple Metal Fastener Burn-Out

In one implementation, the local controller 160 accesses the burn-out database and selects a metal type, a target burn-out temperature, and a target burn-out duration for a possible metal fastener embedded within the recycled wood workpiece. The local controller 160 then monitors the temperature of the possible metal fastener embedded within the section of the recycled wood workpiece occupying the inductor volume 131 to heat the possible metal fastener to the target burn-out temperature and thereby, loosening this possible metal fastener for removal from the recycled wood workpiece by a fastener shank removal module 140.

In one variation, the local controller 160 retrieves a set of target burn-out temperatures for a set of metal fasteners, embedded within a section of the recycled wood workpiece, from the burn-out database. The local controller 160 then: calculates an average burn-out temperature based on the set of target burn-out temperatures; sets an alternating current proportional to the average burn-out temperature; triggers the driver 134 to transmit this alternating current to the inductor 133 to heat this set of possible metal fasteners via induction heating.

For example, the local controller 160 can: access a three-dimensional photographic image of the inductor volume recorded by an optical sensor; extract a set of features representing a surface of a recycled wood workpiece from the image; and based on the set of features, detect a set of metal fasteners embedded in the surface of the recycled wood workpiece and derive a metal type of each metal fastener in the set of metal fasteners. The local controller can then: access the burn-out database specifying metal types, target burn-out temperatures, and target burn-out durations of metal fasteners embedded in the recycled wood workpiece; select a set of target burn-out temperatures associated with the set of metal fasteners in the burn-out database; calculate an average target burn-out temperature for the set of metal fasteners based on a combination of the set of target burn-out temperatures; and trigger the driver 134 to transfer an alternating current through the inductor 133 to induce an electromagnetic field toward the section of the recycled wood workpiece occupying the inductor volume 131 according to the average target burn-out metal temperature.

Accordingly, the inductor 133 can heat the set of metal fasteners embedded within the section of the recycled wood workpiece to the average target burn-out temperature via induction heating. The primary controller 170 can then trigger the conveyance subsystem 110 to move a next section of the recycled wood workpiece toward the entry of the induction module 130 to occupy the inductor volume 131.

The local controller 160 can repeat methods and techniques described above for each other possible metal fastener and for each other section of the recycled wood workpiece to loosen each other possible metal fastener and/or reduce a pull force or torque necessary to remove these possible metal fasteners from the recycled wood workpiece by downstream fastener shank removal modules 140.

Therefore, the local controller 160 can selectively trigger the driver 134 to transfer an alternating current through the inductor 133 to induce an electromagnetic field toward a set of possible metal fasteners embedded in this section of the recycled wood workpiece occupying the inductor volume 131 and thereby, heat the set of possible metal fasteners within the inductor volume 131.

12.5 Recycled Wood Workpiece Threshold Temperature Range

Generally, the local controller 160 can: monitor a surface temperature of nearby subsections (e.g., a subsection proximal a metal fastener) in the section of the recycled wood workpiece occupying the inductor volume 131 during an induction cycle; and, in response to the surface temperature falling within a threshold temperature range approximating a burning point of the recycled wood workpiece, trigger the driver 134 to reduce or terminate the alternating current (e.g., power supply) to the inductor 133 for a next metal fastener. Thus, the induction module 130, the temperature sensor 108, and the local controller 160 can cooperate: to monitor surface temperatures of a nearby subsection of a current metal fastener; to reduce or terminate output power to the inductor 133 for a next metal fastener; to prevent the recycled wood workpiece from overheating and avoid ignition of wood material in the recycled wood workpiece; and to reduce the duration of the induction cycle.

In one implementation, a human operator may apply a wood detector or a wood moisture sensor 108 to the recycled wood workpiece prior to loading the recycled wood workpiece onto the conveyance subsystem 110. The human operator may then interface with the operator portal to access the burn-out database and update the wood type (e.g., a wood species) of the recycled wood workpiece based on an output from the wood detector or wood moisture sensor 108. The local controller 160 can then access the burn-out database and extract the wood type of the recycled wood workpiece from the burn-out database. The local controller 160 can set a threshold temperature range less than a burning point of the wood type for the recycled wood workpiece and monitor surface temperatures of nearby subsections of the recycled wood workpiece populated with possible metal fasteners and occupying the inductor volume 131 during the induction cycle.

Alternatively, the human operator may access the virtual model of the recycled wood workpiece and update a wood type (e.g., a wood species) and define a temperature threshold range for the wood type within the virtual model. The local controller 160 can then implement methods and techniques described above to prevent overheating of the recycled wood workpiece and avoid ignition of the recycled wood workpiece.

12.5.1 Example: Monitoring Surface Temperature

For example, the local controller 160 can implement methods and techniques described above to drive an alternating current through the inductor 133 to induce an electromagnetic field to couple to each possible metal fastener, in a set of possible metal fasteners, embedded in a section of the recycled wood workpiece occupying the inductor volume 131. The inductor 133 can then heat this set of possible metal fasteners embedded in the section of the recycled wood workpiece via induction heating. The local controller 160 can then: access the burn-out database; select a wood type of this recycled wood workpiece from the burn-out database; and set a threshold temperature range (e.g., between 700 degrees Fahrenheit and 730 degrees Fahrenheit) less than a burning point of the recycled wood workpiece (e.g., 750 degrees Fahrenheit) corresponding to the wood type of the recycled wood workpiece.

During the induction cycle, the temperature sensor 108 upstream of the inductor 133 can output a first signal (e.g., a thermal image) corresponding to surface temperatures of subsections of the recycled wood workpiece around a possible metal fastener embedded in the recycled wood workpiece occupying the inductor volume 131. Accordingly, the local controller 160 can: interpret a first surface temperature (e.g., 500 degrees Fahrenheit) of the section of the recycled wood workpiece occupying the inductor volume 131 based on the first signal (e.g., thermal image); and, in response to the first surface temperature falling below the threshold temperature range (e.g., between 700 degrees Fahrenheit and 730 degrees Fahrenheit), trigger the driver 134 to maintain the alternating current through the inductor 133 and thereby, enable the inductor 133 to heat a next metal fastener embedded in the section of the recycled wood workpiece.

The temperature sensor 108 can then output a second signal (e.g., a thermal image) corresponding to a temperature of the section of the recycled wood workpiece occupying the inductor volume 131. The local controller 160 can then: interpret a second surface temperature (e.g., 715 degrees Fahrenheit) of the section of the recycled wood workpiece occupying the inductor volume 131 based on the second signal (e.g., thermal image); and, in response to the second surface temperature (e.g., 715 degrees Fahrenheit) falling within the threshold temperature range (e.g., between 700 degrees Fahrenheit and 730 degrees Fahrenheit), trigger the driver 134 to terminate the alternating current through the inductor 133 and thus prevent the recycled wood workpiece from overheating and avoid ignition of the recycled wood workpiece.

Therefore, the local controller 160 can monitor a surface temperature of the recycled wood workpiece around a previously heated metal fastener during the induction cycle and selectively trigger the driver 134 to increase, reduce, maintain, and/or to terminate the alternating current through the inductor 133 to avoid ignition of the recycled wood workpiece for a next metal fastener embedded in the recycled wood workpiece.

12.6 Fire Mitigation+Prevention

In one variation, the system 100 further includes a fume hood arranged above the induction module 130 and configured to reduce volumes of smoke within the inductor volume 131. Responsive to a surface temperature of the recycled wood workpiece exceeding the threshold temperature range (e.g., between 700 degrees Fahrenheit and 730 degrees Fahrenheit) and indicating ignition of the recycled wood workpiece (e.g., an ignition event, a fire event), the local controller 160 activates the fume hood to reduce the volume of smoke exiting from the induction module 130 into the facility.

In one implementation, the local controller 160 interprets a surface temperature of the recycled wood workpiece, proximal a location of a possible metal fastener in the recycled wood workpiece, based on a signal from a temperature sensor 108 facing the inductor volume 131. Then, in response to detecting the surface temperature exceeding a threshold surface temperature, the local controller 160: detects an ignition event of wood material, in the recycled wood workpiece, around the possible metal fastener; and activates the fume hood to reduce a volume of smoke generated by the ignition event.

For example, the local controller 160 can implement methods and techniques described above to drive an alternating current through the inductor 133 to induce an electromagnetic field toward a metal fastener embedded within a section of the recycled wood workpiece occupying the inductor volume 131 at a first time. Accordingly, the inductor 133 can heat the metal fastener via induction heating and the local controller 160 can trigger the inductor stage 136 to locate the inductor 133 proximal a next metal fastener at a second time. At approximately the second time (e.g., within 100 milliseconds of the second time), the temperature sensor 108 can output a signal corresponding to a temperature of the section of the recycled wood workpiece, around the previous metal fastener, occupying the inductor volume 131. The local controller 160 can then interpret a surface temperature (e.g., 750 degrees Fahrenheit) of the section of the recycled wood workpiece occupying the inductor volume 131 based on the signal. In response to the surface temperature (e.g., 750 degrees Fahrenheit) exceeding the threshold temperature range (e.g., between 700 degrees Fahrenheit and 730 degrees Fahrenheit) and corresponding to an ignition event, the local controller 160 can: trigger the driver 134 to terminate the alternating current through the inductor 133; and activate the fume hood to reduce a volume of smoke, within the inductor volume 131, generated by the ignition event.

At a third time, succeeding the second time, the inductor 133 can heat the metal fastener via induction heating and the local controller 160 can trigger the inductor stage 136 to locate the inductor 133 proximal a next metal fastener. The temperature sensor 108 can output a second signal corresponding to a temperature of the section of the recycled wood workpiece, around the previous metal fastener, occupying the inductor volume 131. The local controller 160 can then: interpret a second surface temperature (e.g., 695 degrees Fahrenheit) of the section of the recycled wood workpiece occupying the inductor volume 131 based on the second signal; and, in response to the second surface temperature (e.g., 695 degrees Fahrenheit) falling below the threshold temperature range (e.g., between 700 degrees Fahrenheit and 730 degrees Fahrenheit), deactivate the fume hood and resume the induction cycle.

In another variation, the fume hood is configured to reduce volumes of smoke within the inductor volume 131 throughout the duration of the induction cycle. In this variation, at the commencement of the induction cycle, the local controller 160 activates the fume hood to reduce the volume of smoke exiting from the induction module 130 into the facility while the inductor 133 heats metal fasteners via induction heating.

Therefore, the local controller 160 can cooperate with a fume hood to reduce smoke within the inductor volume 131 and reduce oxygen in a sample environment to prevent ignition of a fire, mitigate a volume of smoke generated via induction heating of a metal fastener, and/or mitigate a volume of smoke generated from an ignition event of wood material in the recycled wood workpiece during the induction cycle.

12.6.1 Anaerobic Chamber

In one variation, the system 100 includes an anaerobic chamber defining a sample volume and configured to reduce oxygen within the sample volume. Prior to the induction cycle, a human operator and/or a machine (e.g., a forklift) places the induction module 130 within the sample volume of the anaerobic chamber. The local controller 160 then initiates the induction cycle.

Therefore, the anaerobic chamber, induction module 130, and the local controller 160 can cooperate to reduce the oxygen within the sample volume during an induction cycle and prevent ignition of a fire from the recycled wood workpiece occupying the inductor volume 131.

12.7 Variation: Induction End Effector

In one variation, the induction module 130 can include: a multi-axis stage; an induction end effector; a set of module actuators; and a local controller 160. In this variation, the multi-axis stage includes a three-axis gantry (e.g., X-, Y-, and Z-axes): supported by the chassis 104; arranged in the inductor volume 131 over a section of the conveyance subsystem 110; configured to face (e.g., is arranged over, under, or adjacent) one side of the recycled wood workpiece occupying the inductor volume 131; and configured to support the induction end effector over a range of vertical, lateral, and longitudinal positions to enable the induction end effector to access and heat metal fasteners (e.g., nails, screws, staples)—via induction heating—in a range of positions and orientations on an adjacent side of the recycled wood workpiece.

Furthermore, the induction module 130 can include a multi-loop helical conductive coil (e.g., a copper wire coil, an aluminum wire coil) that defines an air core intersecting the inductor volume 131 and arranged about a distal end of the induction end effector. The local controller 160 can then trigger the multi-axis stage to manipulate the induction end effector, and thus the conductive coil over a range of vertical, lateral, and longitudinal positions to access and heat metal fasteners (e.g., nails, screws, staples) embedded in a section of the recycled wood workpiece via induction heating.

In another variation, the multi-axis stage includes a robotic arm, such as a three-link robotic arm with a base rigidly mounted to the chassis 104 and configured to reach the full length and width of the near side of a segment of a recycled wood workpiece occupying the inductor volume 131. In this variation, the set of actuators are configured to manipulate joints between the base and links of the robotic arm. The robotic arm further includes an inductor 133 mount coupled to a proximal end of the robotic arm, opposite the base, and configured to support the inductor 133.

In yet another variation, the multi-axis stage includes: a single-axis gantry arranged over (or adjacent, under) and parallel to the conveyance subsystem 110; and a two-link robotic arm mounted to the gantry and configured to cooperate with the gantry to reach the full length and width of the near side of the segment of a recycled wood workpiece occupying the inductor volume 131. In this variation, the set of actuators are configured to manipulate the gantry and joints between links of the robotic arm to reach the induction end effector throughout the inductor volume 131.

12.7.1 Target Metal Fastener Burn-Out

In one variation, the induction module 130 includes an induction end effector configured to access and heat—via the inductor 133—a possible metal fastener embedded in a section of the recycled wood workpiece.

As described above, the induction module 130 can include a multi-axis stage configured to support the induction end effector. In this variation, the induction end effector includes a plate and a vertical stage arranged on the multi-axis stage. The plate includes: a proximal face coupled to a distal end of the vertical stage; and a distal face opposite the proximal face configured to support the inductor 133. The vertical stage is configured to advance the plate and thus, the inductor 133 toward a possible metal fastener embedded in the recycled wood workpiece occupying the inductor volume 131 and to retract the plate to withdraw the induction end effector and the inductor 133 from the recycled wood workpiece.

Furthermore, the multi-axis stage is operable in three degrees of freedom to locate the induction end effector and the inductor 133 over a range of positions within the inductor volume 131. The induction end effector is pivotally coupled to the distal end of the multi-axis gantry via the vertical stage. Accordingly, the local controller 160 can drive the multi-axis stage and the plate to locate the inductor 133 adjacent (e.g., spanning) the shaft, shank, and/or head of a metal fastener embedded in a side of a recycled wood workpiece. Thus, the induction end effector can support and locate the inductor 133 in three degrees of freedom.

However, the elements of the induction end effector described above can be arranged in any other configuration to similarly support and locate the inductor 133 in three degrees of freedom.

12.7.2 Example: Induction End Effector+Individual Metal Fastener Burn-Out

In this example, the inductor 133 can include a copper pancake coil coupled to the induction end effector via the plate. The local controller 160 can then manipulate the induction end effector, via the multi-stage axis, to align with a metal fastener embedded in a side of the recycled wood workpiece and implement methods and techniques described above to trigger the inductor 133 to heat the metal fastener within the inductor volume 131.

For example, during an induction cycle, the local controller 160 can: access the virtual model for the recycled wood workpiece occupying the inductor volume 131; isolate a metal fastener within the virtual model; extract a position, an orientation, and a target metal fastener burn-out temperature for this metal fastener from the virtual model; derive an induction position for the induction end effector to access a corresponding metal fastener extending from a side of the recycled wood workpiece based on the position and orientation from the virtual model; and autonomously navigate the multi-axis stage to locate the inductor 133 adjacent (e.g., spanning) a segment of the metal fastener extending above a side of the recycled wood workpiece. Then, in response to detecting a position of the induction end effector corresponding to (e.g., matching, analogous to) the induction position, the local controller 160 can: trigger the vertical stage to extend the plate to locate the inductor 133 proximal (e.g., within a threshold distance of) the metal fastener; derive a target alternating current for the conductive pancake coil; and trigger the driver 134 to supply the target alternating current through the inductor 133 to generate an electromagnetic field within the conductive coil. The conductive coil can then heat the metal fastener extending above the side of the recycled wood workpiece to the target burn-out temperature via induction heating.

The local controller 160 can then repeat methods and techniques described above for each other metal fastener to loosen and/or reduce a pull force or torque necessary to remove each metal fastener embedded in a side of the recycled wood workpiece for removal by a downstream fastener shank removal module 140.

Therefore, in this example, the local controller 160 can manipulate the induction end effector—via the multi-axis stage—and thus the inductor 133 in three degrees of freedom to access and heat individual metal fasteners embedded in a side of a recycled wood workpiece occupying the inductor volume 131.

12.8 Fastener Removal Schedule

Generally, upon termination of the induction cycle, the local controller 160 can confirm presence and/or absence of possible metal fasteners embedded in the recycled wood workpiece according to signals received from a temperature sensor 108. The local controller 160 can then generate a fastener removal schedule for execution by a fastener shank removal module 140.

In one implementation, the induction module 130 includes a temperature sensor 108: facing an output side of the induction module 130 or arranged downstream of the induction module 130; and configured to output signals corresponding to surface temperatures of wood material, in the recycled wood workpiece, proximal locations of these possible metal fasteners. The local controller 160 of the induction module 130 can confirm presence of a possible metal fastener responsive to a surface temperature exceeding a threshold surface temperature. Alternatively, the local controller 160 can confirm absence of a possible metal fastener responsive to the surface temperature falling below the threshold temperature.

For example, upon termination of an induction cycle, the local controller 160 can: interpret a first surface temperature of wood material, in the recycled wood workpiece, around a first possible metal fastener in a first location based on a first signal from the temperature sensor 108; and, in response to the surface temperature exceeding a threshold surface temperature, confirm presence of the first metal fastener proximal the first location; and record the first location occupied by the first metal fastener. The local controller 160 can then: interpret a second surface temperature of wood material, in the recycled wood workpiece, around a second possible metal fastener in a second location based on a second signal from the temperature sensor 108; in response to the surface temperature falling below the threshold surface temperature, confirm absence of the second metal fastener proximal the second location; and identify absence of the second metal fastener in the second location. Accordingly, the local controller 160 can generate a fastener removal schedule for execution by a fastener shank removal module 140.

The local controller 160 can repeat these methods and techniques for each other possible metal fastener embedded in the recycled wood workpiece to generate a fastener removal schedule for the recycled wood workpiece. The primary controller 170 can then trigger the conveyance subsystem 110 to drive a section of the recycled wood workpiece toward a work volume 106 of a fastener shank removal module 140.

Therefore, the local controller 160 of the induction module 130 can confirm absence and/or presence of possible metal fasteners embedded in the recycled wood workpiece, thereby reducing and/or eliminating false positives (e.g., accidental identification of a surface contaminant or plastic fastener as a possible metal fastener) and false negatives (e.g., missing a non-reflective possible metal fastener) prior to a fastener removal cycle.

13. Fastener Removal Cycle

Once a section of the recycled wood workpiece enters a work volume 106 of a fastener shank removal module 140, the local controller 160 can access and execute a fastener removal cycle.

In one implementation, the local controller 160 executes the fastener removal schedule and accesses an image of the work volume 106 captured by the optical sensor 108. Based a set of features detected in the image, the local controller 160: detects a metal fastener in the section of the recycled wood workpiece occupying the work volume 106; and derives a position and an orientation of the first fastener in the work volume 106. The local controller 160 then: identifies the metal fastener as a first metal fastener, specified for removal, in the fastener removal schedule; defines a target engagement position of the non-threaded fastener end effector, to engage the first fastener, based on the position and the orientation of the metal fastener within the work volume 106; triggers the stage to drive the extractor end effector 142 to the target engagement position; triggers the jaw actuator 143 to drive the set of jaws 145 to engage the metal fastener in the section of the recycled wood workpiece; and triggers the stage to retract the extractor end effector 142 from the target engagement position to extract and remove the metal fastener from the recycled wood workpiece.

The local controller 160 can repeat these methods and techniques for each other metal fastener specified in the fastener removal schedule to remove metal fasteners embedded within the recycled wood workpiece occupying the work volume 106.

14. Variation: Internal Imaging Scans

In one variation, the system 100 includes an X-ray scan module arranged on the chassis 104 proximal the entry of the chassis 104 and includes an X-ray sensor 108 facing a scan volume.

Generally, the system 100 can receive a recycled wood workpiece in the scan volume of the X-ray scan module. The primary controller 170 can then: access internal imaging data captured by the X-ray scan module; detect internal features representing metallic objects (e.g., possible metal fasteners) in these internal imaging data; extract positions and orientations of these internal features; identify a metal fastener type and a metal type of each internal feature; and compile these internal imaging data into a three-dimensional representation (or "virtual model") of the recycled wood workpiece annotated with positions, orientations, and metal fastener types (e.g., non-threaded, threaded, nail, staple, screw). The primary controller 170 is configured to: access a set of internal imaging scans (e.g., a set of internal imaging scans) captured by the X-ray scan module as the conveyance subsystem no moves a recycled wood workpiece through the X-ray scan module; and compile these internal imaging scans into a two- or three-dimensional virtual model of the recycled wood workpiece.

14.1 X-Ray Scan Module

The X-ray scan module is configured to capture a sequence of internal imaging data of the recycled wood workpiece as a machine (e.g., a forklift) or a human operator drives the recycled wood workpiece past the X-ray scan module during a first segment of the processing cycle. Furthermore, the X-ray scan module is arranged within a threshold distance of the entry of the chassis 104 of a first fastener shank removal module 140 in a set of fastener shank removal modules 140 (e.g., a set of non-threaded fastener shank removal modules 140 120, a set of threaded fastener shank removal modules 140 130) and defines a scan volume.

In one implementation, the X-ray scan module includes a three-dimensional X-ray sensor 108 facing a scan volume occupied by the recycled wood workpiece. In this implementation, the X-ray sensor 108 can capture a set of internal imaging scans of the recycled wood workpiece as the machine (e.g., a forklift) or the human operator drives the recycled wood workpiece past the X-ray scan module. The primary controller 170 can then compile this set of internal imaging scans into a three-dimensional model (or "virtual model")—annotated with the internal features and defining a recycled wood workpiece coordinate system—of the recycled wood workpiece.

In one variation, the X-ray scan module includes a set of three-dimensional internal imaging sensors 108 (e.g., magnetic resonance sensors 108, millimeter wave sensors 108, X-ray sensors 108) facing the scan volume occupied by the recycled wood workpiece. In this variation, each internal imaging sensor 108 in the set of internal imaging sensors 108 can capture a set of internal imaging scans of the recycled wood workpiece as the machine (e.g., a forklift) or the human operator drives the recycled wood workpiece past the X-ray scan module. The primary controller 170 can then implement methods and techniques described above to compile these sets of internal imaging scans into a virtual model—annotated with the internal features—of the recycled wood workpiece.

In another implementation, the X-ray scan module includes a one-dimensional X-ray line scanner arranged over (or facing laterally across) the scan volume occupied by the recycled wood workpiece. In this implementation, the X-ray scanner can capture a series of X-ray line scans of the recycled wood workpiece as the machine (e.g., a forklift) or the human operator drives the recycled wood workpiece past the X-ray scan module. The primary controller 170 can then compile these X-ray line scans into a two-dimensional X-ray scan of the recycled wood workpiece.

14.2 Processing Cycle: Initial Imaging

Once the primary controller 170 initiates the processing cycle, the primary controller 170 can: receive a recycled wood workpiece in a scan volume; access a set of internal imaging scans captured by an internal imaging sensor 108 (e.g., an X-ray sensor 108) facing the scan volume occupied by the recycled wood workpiece; detect a set of internal features representing metallic objects in the set of internal imaging scans; and compile the first set of internal imaging scans into a three-dimensional representation (or "virtual model") of the recycled wood workpiece. A first fastener shank removal module 140 can receive a section of the recycled wood workpiece in a work volume 106. The primary controller 170 can then: access an image, in a set of images, captured by the optical sensor 108 arranged within the fastener shank removal module 140; detect external features extending above the section of the recycled wood workpiece; scan the virtual model to identify each external feature with an analogous internal feature; identify each external feature as a metal fastener; and generate a metal fastener removal schedule for each external feature.

14.2 Processing Cycle: Virtual Model

The primary controller 170 compiles the set of internal imaging scans into a virtual model of the recycled wood workpiece, such as depicting: internal features, representing metallic objects, and defects of the recycled wood workpiece.

In one implementation in which the X-ray scan module includes two fixed perpendicular line scanners or an X-ray sensor 108 that sweeps across two axes perpendicular to the recycled wood workpiece as a machine (e.g., forklift) and/or human operator advances the recycled wood workpiece toward a first fastener shank removal module 140, the system 100 can: compile the sequence of X-ray scan data captured by these X-ray scanners into a three-dimensional representation (or "virtual model") of the recycled wood workpiece annotated with these internal features (e.g., metallic objects and defects).

Furthermore, the primary controller 170 can: access an internal imaging scan of the recycled wood workpiece occupying the scan volume; detect a set of internal features (i.e., set of metal fasteners) populated in the recycled wood workpiece; detect a helical ridge metal fastener in the set of metal fasteners based on a features detected in the X-ray scan; extract an initial position and an initial orientation of the helical ridge metal fastener in the set of metal fasteners; correlate the features representing the helical ridge metal fastener with known features of threaded metal fasteners from a threaded burn-out database; compile correlations into the virtual model (e.g., three-dimensional model) of the work volume 106; and label the helical ridge metal fastener in the virtual model with a threaded metal fastener type, the initial position, and the initial orientation. The primary controller 170 can then: isolate a subsection in the virtual model containing the threaded metal fastener label; isolate a secondary subsection of the recycled wood workpiece in an image—captured by the optical sensor 108 facing the work volume 106 of a fastener shank removal module 140— corresponding to the subsection in the virtual model; extract a subset of features from a region in the image depicting the secondary subsection of the recycled wood workpiece in the image; identify the subset of features as a head of a first metal fastener detected in the image; map the initial position and initial orientation of the helical ridge metal fastener from the subsection of the virtual model to the metal fastener head identified in the image; and identify the metal fastener as the helical ridge metal fastener in response to the first position and the first orientation of the metal fastener— extracted from the image—matching the initial position and the initial orientation of the helical ridge metal fastener from the virtual model.

Similarly, the primary controller 170 can implement these methods and techniques to detect a smooth shank metal fastener in the set of metal fasteners based on features detected in the X-ray scan; extract an initial position and an initial orientation of the smooth shank metal fastener in the set of metal fasteners; correlate the features representing the smooth shank metal fastener with known features of non-threaded metal fasteners from a non-threaded burn-out database; compile correlations into the virtual model of the work volume 106; and label the smooth shank metal fastener in the virtual model with a non-threaded metal fastener type, the initial position, and the initial orientation. The primary controller 170 can then: isolate a subsection in the virtual model containing the non-threaded metal fastener label; isolate a secondary subsection of the recycled wood workpiece in the image corresponding to the subsection in the virtual model; extract a subset of features from a region in the image depicting the secondary subsection of the recycled wood workpiece in the image; identify the subset of features as a head of a metal fastener detected in the image; map the initial position and initial orientation of the smooth shank metal fastener from the subsection of the virtual model to the metal fastener head detected in the image; and identify the metal fastener as the smooth shank metal fastener in response to the first position and the first orientation— extracted from the image—of the metal fastener matching the initial position and the initial orientation of the first smooth shank metal fastener.

However, the primary controller 170 can implement any other method or technique to generate a representation of the internal features of the recycled wood workpiece based on X-ray data collected by the X-ray scan module.

14.4 Processing Cycle: Internal Recycled Wood Workpiece Characteristics

The primary controller 170 can also detect internal characteristics and features of the recycled wood workpiece based on these internal imaging scans, such as including: splits; holes; rot; embedded metal (i.e., metallic objects fully contained within the recycled wood workpiece); knots; and/or metal fasteners (e.g., metallic objects that extend above surfaces of the recycled wood workpiece).

In one implementation, the primary controller 170: compiles the sequence of X-ray scan data captured by these X-ray scanners into a two- or three-dimensional representation of internal features (i.e., defects) in the recycled wood workpiece; and detects and extracts two-dimensional or three-dimensional constellations of features from this internal representation of the recycled wood workpiece. For example, the primary controller 170 can: implement blob detection, object recognition, and/or other techniques to group individual features detected in the internal representation of the recycled wood workpiece into a set of feature constellations; implement artificial intelligence and/or machine learning techniques to correlate these constellations of features with known characteristics of splits, holes, rot, embedded metal, and knots; and label these constellations of features in the internal representation of the recycled wood workpiece accordingly and/or project these constellations and labels onto the virtual model.

Alternatively, the primary controller 170 can access a database of template images representing various examples of these defect types, such as derived from scan data of previous recycled wood workpieces processed by the system

100. Then, for each feature constellation in this set, the primary controller 170 can: compare the feature constellation to a template image in the database; and characterize a similarity of the feature constellation to the template image. If this similarity exceeds a threshold similarity, the primary controller 170 can annotate the feature constellation with a defect type and other attributes stored in or associated with the template image.

However, the primary controller 170 can implement any other method or technique to detect or characterize internal features of the recycled wood workpiece based on X-ray scan data captured by the X-ray scan module.

14.5 Processing Cycle: Superficial Metal Fasteners

The primary controller 170 can also interpret types, positions, and/or orientations of metal fasteners on each side of the recycled wood workpiece based on these X-ray and/or optical scan data captured upstream of the fastener head removal module.

14.5.1 Recycled Wood Workpiece Faces

In one implementation, the primary controller 170 implements plane detection techniques to detect a set of faces (e.g., six "sides") in the virtual model that are approximately perpendicular. For each face detected in the virtual model, the primary controller 170: isolates a set of superficial points in the virtual model that represent this face; calculates a plane characterized by least error (e.g., shortest Euclidean distance) between the plane and the set of superficial points; and stores the plane as a ground plane of this face in the virtual model.

In another implementation, the primary controller 170: implements plane detection techniques to detect a set of faces (e.g., six sides) in the virtual model that are approximately perpendicular; retrieves virtual recycled wood workpiece geometry, such as a virtual rectangular cuboid (or virtual rectangular prism); projects the virtual recycled wood workpiece geometry onto the virtual model; resizes and warps (e.g., curve) faces of the virtual recycled wood workpiece geometry to minimize error between each face of the virtual recycled wood workpiece geometry and points representing the corresponding faces of the virtual model; and stores the faces of the first recycled wood workpiece geometry as ground planes of the faces in the virtual model.

For example, the primary controller 170 can detect a set of faces of the recycled wood workpiece in the virtual model and access a template geometry representing geometry of known faces of the recycled wood workpiece. Then, for each face in the set of faces, the primary controller 170 can: isolate a set of superficial points of the face in the virtual model; project the template geometry of a known face onto the set of superficial points of the face in the virtual model; calculate an offset distance between the template geometry of the known face and the set of superficial points of the face in the virtual model; and, in response to the offset distance falling below a threshold offset distance, store the template geometry of the known face as a ground plane of the face in the virtual mode.

14.5.2 Metal Fastener Locations

In one implementation, for a first face in the virtual model, the primary controller 170: scans the virtual model for discrete clusters of points extending above the ground plane of the first face and representing internal features; and labels each cluster of points representing an internal feature as a possible metal fastener.

Then, for a first cluster of points representing a first possible metal fastener, primary controller 170 can: isolate a first subset of points—representing a shank of an initial internal feature—intersecting (e.g., nearest) the ground plane of the first face in the virtual model; calculate a first centroid of the first subset of points; isolate a second subset of points of a first plane—representing a head of the initial internal feature (e.g., the top surface of a flat head of a nail or a top surface of a flat head of a screw or a top surface of a connecting segment and/or leg of a staple)—within a threshold distance of the ground plane of the first face (e.g., furthest from the ground plane of the first face); calculate a second centroid of the second subset of points; and calculate a first vector—such as within a coordinate system of the virtual model—between the first subset of points and the second subset of points based on the first and second centroids. The primary controller 170 can then label the first cluster of points in the virtual model with the first vector, representing an initial orientation and an initial position of the head of the initial internal feature.

The primary controller 170 repeats this process for each other cluster of points representing possible metal fasteners (e.g., nails, screws, staples) and repeats this process for each other side of the virtual model to annotate all possible recycled wood workpieces, their orientations, and their head or connecting segment locations.

14.5.3 Metal Fastener Type+Virtual Model

Generally, the primary controller 170 can implement artificial intelligence, template matching, computer vision techniques, and/or statistical methods, etc. to: extract a set of features from a cluster of points representing a possible metal fastener in the virtual model or from the optical scan data directly; and to match (or "map") the set of features to a particular metal fastener type.

More specifically, the primary controller 170 can: detect a first subset of internal features representing metallic objects from the internal imaging scans; characterize a first smoothness quality of the first subset of internal features; detect a second subset of internal features representing metallic objects from the internal imaging scans; and characterize a second smoothness quality of the second subset of internal features. Then, in response to the first smoothness quality exceeding a threshold smoothness quality, the primary controller 170 can label the first subset of internal features with a non-threaded metal fastener type (e.g., nail, staple, nail retainer) in the virtual model. Similarly, in response to the second smoothness quality falling below the threshold smoothness quality, the primary controller 170 can label the second subset of internal features with a threaded metal fastener type (e.g., screw) in the virtual model.

14.5.4 Metal Fastener Data from Internal Imaging Scans

In the variation described above in which the X-ray scanner captures three-dimensional X-ray data of the recycled wood workpiece, the primary controller 170 can also assimilate superficial three-dimensional optical data representing a metal fastener and adjacent internal X-ray data representing a metallic object into one composite representation of the metal fastener. The primary controller 170 can then implement methods and techniques described above to: detect a first cluster of X-ray-based points representing the distal end of the metal fastener—embedded in the recycled wood workpiece—in the virtual model; calculate a first centroid of the first cluster of points; isolate a second cluster of optical-based points furthest from the ground plane of the corresponding face of the virtual model; calculate a second centroid of the second cluster of optical-based points; calculate a vector—such as within a coordinate system of the virtual model—extending between the first and second centroids; and store this vector as the orientation of the metal fastener.

In a similar implementation, the primary controller 170 can: calculate an arc characterized by minimum error (e.g., minimum aggregate Euclidean distance) between the arc and X-ray- and optical-based points that represent the metal fastener in the virtual model; calculate a tangent of this arc at its intersection with the ground plane of the corresponding face in the virtual model; and store a vector—defining this tangent in the coordinate system of the virtual model—as the orientation of the metal fastener.

In this variation, the primary controller 170 can also verify or predict the metal fastener type based on the X-ray scan data. In one implementation, the primary controller 170: identifies a cluster of points in the X-ray scan data depicting a cylindrical metallic object within the volume of the recycled wood workpiece (and contiguous with a metal fastener identified about a ground plane of a face in the virtual model); identifies this cluster of points as a shank or barrel of a metal fastener; and characterizes a smoothness quality of the shank or barrel of the metal fastener. For example, the primary controller 170 can: map a sawtooth pattern onto the cluster of points, such as extending between the distal and proximal ends of the metal fastener as described above; calculate an amplitude and frequency of the sawtooth pattern that minimizes an error (e.g., a Euclidean distance) between the sawtooth pattern and the cluster of points; and characterize smoothness of the metal fastener inversely proportional to the amplitude and frequency. The primary controller 170 can then: identify the metal fastener as a nail if smoothness exceeds a threshold smoothness (e.g., the amplitude and frequency of the projected sawtooth pattern fall below threshold values); and otherwise identify the metal fastener as a threaded metal fastener (e.g., a screw).

In another variation, the primary controller 170 can: extract a profile of the cluster of points from the X-ray scan data; implement template matching to match the profile to a stored nail or threaded metal fastener profile; and/or implement artificial intelligence to identify a metal fastener type corresponding to this profile. In this variation, the primary controller 170 can then fuse this X-ray-based predicted metal fastener type with an optical-based predicted metal fastener type of an adjacent or contiguous metal fastener detected above the ground plane on the corresponding side of the virtual model to refine or verify the type of the metal fastener. For example, the primary controller 170 can: implement methods and techniques described above to derive a first metal fastener type prediction based on images from the optical sensor 108 representing external features of the recycled wood workpiece; implement these methods and techniques to derive a second metal fastener type prediction based on X-ray scan data representing internal features of the recycled wood workpiece; and combine (or "fuse") the first and second metal fastener type predictions into a final prediction for the type of the metal fastener, such as by calculating a combination of these predictions weighted by their corresponding confidence scores.

The primary controller 170 can implement this process for each other metal fastener and/or embedded metal detected in the X-ray scan and/or the virtual model.

14.6 Induction Cycle: Target Burn-Out Temperatures from Upstream Sensor

During an induction cycle, the local controller 160 is configured to: access the virtual model of the recycled wood workpiece annotated with locations and characteristics to derive a toolpath for the inductor 133; set target burn-out temperatures of metal fasteners based on signals from a temperature sensor downstream of the inductor 133; derive a target alternating current based on a first target burn-out temperature; and trigger the driver 134 to supply the target alternating current to the inductor 133 to generate an electromagnetic field within the inductor volume 131 and heat the metal fastener embedded in the recycled wood workpiece via induction heating. The local controller 160 can then: interpret a temperature of the metal fastener embedded in the section of the recycled wood workpiece based on a signal from the temperature sensor; and selectively adjust power output to the inductor 133 based on the temperature of the metal fastener during the induction cycle.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system for removing fasteners embedded in a recycled wood workpiece comprising:
   an induction module:
      defining an inductor volume; and
      comprising:
         a conveyor configured to drive the recycled wood workpiece populated with metal fasteners through the inductor volume;
         a first sensor:
            facing the inductor volume;
            configured to output a signal representing a first location of a first metal fastener embedded in a first face of the recycled wood workpiece; and
            configured to output a second signal representing a second location of a second fastener embedded in the recycled wood workpiece;
         an inductor:
            arranged within the inductor volume;

facing a first side of the recycled wood workpiece within the inductor volume; and configured to generate an electromagnetic field that couples to and heats the first metal fastener via induction heating, the first metal fastener embedded in the first side of the recycled wood workpiece and burning wood material, in the recycled wood workpiece, proximal the first location to reduce retention of the first metal fastener by the recycled wood workpiece;

an inductor stage configured to:

ride over the first face of the recycled wood workpiece along a longitudinal axis of the induction module to locate the inductor proximal the first location of the first metal fastener; and offset the inductor above the first face of the recycled wood workpiece by a target coupling distance;

a second inductor:

facing a second side orthogonal to the first side of the recycled wood workpiece within the inductor volume; and configured to generate a second electromagnetic field that couples to and heats the second metal fastener via induction heating, the second metal fastener burning wood material, in the recycled wood workpiece, around the second metal fastener to reduce retention of the second metal fastener by the recycled wood workpiece; and a second inductor stage configured to locate the second inductor adjacent the second location of the second metal fastener.

2. The system of claim 1, further comprising a fastener head removal module:

defining a work volume;

arranged upstream of the induction module;

comprising a first cutter:

arranged within the work volume; and configured to:

resect heads from shanks of metal fasteners embedded within a first side of the recycled wood workpiece;

remove surface contaminants from the first side of the recycled wood workpiece; and remove a surface layer of wood material from the first side of the recycled wood workpiece to reveal an inner layer of the recycled wood workpiece; and comprising a second cutter:

arranged within the work volume adjacent the first cutter; and configured to:

resect heads from shanks of metal fasteners embedded within a third side, opposite the first side, of the recycled wood workpiece;

remove surface contaminants from the third side of the recycled wood workpiece; and remove the surface layer of wood material from the third side of the recycled wood workpiece to reveal the inner layer of the recycled wood workpiece.

3. The system of claim 2:

wherein the first sensor comprises an optical sensor configured to capture an image of the inductor volume; and further comprising a controller configured to:

access the image from the optical sensor;

detect a region of the image depicting the inner layer of the first side of the recycled wood workpiece;

based on a set of features detected in the region of the image:

detect a reflective elliptical object embedded in the inner layer; and derive a second location of the reflective elliptical object;

identify the second location of the reflective elliptical object as the first location of the first metal fastener; and trigger the inductor stage to drive the inductor within a target coupling distance of the first location of the first metal fastener.

4. The system of claim 2:

wherein the first cutter is arranged in a first lateral position within the work volume;

wherein the fastener head removal module comprises:

a second sensor configured to output a second signal representing a width of the recycled wood workpiece; and a first cutter actuator coupled to the second cutter and configured to actuate the second cutter over a range of lateral positions; and further comprising a controller configured to:

calculate a second lateral position of the second cutter to offset the second cutter from the first cutter by a distance proportional to the width of the recycled wood workpiece:

based on the first position of the first cutter; and based on the second signal from the second sensor; and trigger the first cutter actuator to drive the second cutter to the second lateral position.

5. The system of claim 2, wherein the fastener head removal module comprises:

a first roller:

coupled to an input side of the fastener head removal module;

extending parallel to and laterally offset from a longitudinal axis of the fastener head removal module; and comprising a first set of standoffs:

extending radially from the first roller;

defining a nominal length greater than a nominal metal fastener length; and configured to locate a first side of the recycled wood workpiece at the input side; and a second roller:

coupled to the input side of the fastener head removal module;

extending parallel to and laterally offset from the longitudinal axis of the fastener head removal module opposite the first roller; and comprising a second set of standoffs:

extending radially from the second roller;

defining the nominal length greater than the nominal metal fastener length; and configured to locate a second side of the recycled wood workpiece, opposite the first side, at the input side.

6. The system of claim 1:

wherein the first sensor comprises an optical sensor configured to capture an image of the work volume;

further comprising a controller configured to:

access the image of the work volume captured by the
optical sensor;

detect a surface of the recycled wood workpiece
depicted in a region of the image;

based on a set of features detected in the region of the
image:

detect a set of reflective elliptical objects in the
surface of the recycled wood workpiece; and derive a location of each reflective elliptical object in
the set of reflective elliptical objects;

identify a second location of a first reflective elliptical
object, in the set of reflective elliptical objects, as the
first location of the first metal fastener; and identify a third location of a second reflective elliptical
object, in the set of reflective elliptical objects, as a
second metal fastener embedded in the recycled
wood workpiece;

wherein the inductor is further configured to generate a
second electromagnetic field that couples to and heats
the second metal fastener via induction heating;

further comprising a second sensor downstream of the
induction module and configured to output signals
corresponding to surface temperatures of the recycled
wood workpiece; and wherein the controller is further configured to:

interpret a first surface temperature of the recycled
wood workpiece, proximal the first location, based
on a first signal from the second sensor;

confirm presence of the first metal fastener proximal
the first location in response to the first surface
temperature exceeding a threshold temperature;

interpret a second surface temperature of the recycled
wood workpiece, proximal the third location, based
on a second signal from the second sensor; and confirm absence of the second metal fastener, proximal
the third location, in response to the second surface
temperature falling below the threshold temperature.

7. The system of claim 6:

further comprising a chassis defining a work volume;

further comprising a fastener shank removal module:

arranged downstream of the induction module; and comprising:

an optical sensor facing the work volume;

a stage supported by the chassis; and an extractor end effector:

supported and manipulated on the chassis via the
stage; and comprising:

a set of jaws configured to engage and retain
metal fasteners from the recycled wood work-
piece; and a jaw actuator configured to actuate the set of
jaws; and wherein the controller is further configured to:

record the first location occupied by the first metal
fastener;

identify absence of the second metal fastener in the
second location; and generate a fastener removal schedule for execution by
the fastener shank removal module.

8. The system of claim 1:

wherein the first sensor comprises an optical sensor
configured to capture an image of the inductor volume;

wherein the inductor comprises:

a driver electrically coupled to a power source; and a conductive coil electrically coupled to the driver; and further comprising a controller configured to:

access the image of the inductor volume captured by
the optical sensor;

based on a set of features detected in the image:

detect the first metal fastener in a section of the
recycled wood workpiece occupying the inductor
volume; and derive the first location and a first dimension, in a set
of dimensions, of the first metal fastener in the
inductor volume;

access a first target burn-out temperature associated
with the first dimension, in the set of dimensions, of
the first metal fastener;

derive a target alternating current for the driver based
on the first target burn-out temperature;

trigger the inductor stage to locate the inductor within
a target coupling distance of the first location of the
first metal fastener; and trigger the driver to supply the target alternating current
to the conductive coil to generate the electromag-
netic field to couple to and heat the first metal
fastener in the section of the recycled wood work-
piece.

9. The system of claim 1:

wherein the first sensor is configured to output a third
signal representing fastener sizes of the first metal
fastener and a second metal fastener; and further comprising a controller configured to:

based on the third signal from the first sensor:

interpret a first size of the first metal fastener; and interpret a second size of the second metal fastener,
the second size of the second metal fastener cor-
responding to the first size of the first metal
fastener; and set a target burn-out duration proportional to the first
size of the first metal fastener.

10. A system for removing fasteners embedded in a
recycled wood workpiece comprising:

an induction module:

defining an inductor volume; and comprising:

a first sensor:

facing the inductor volume; and configured to output a signal representing a first
location of a first metal fastener embedded in
the recycled wood workpiece;

an inductor:

arranged within the inductor volume; and configured to generate an electromagnetic field
that couples to and heats the first metal fastener
via induction heating, the first metal fastener
burning wood material, in the recycled wood
workpiece, proximal the first location to reduce
retention of the first metal fastener by the
recycled wood workpiece;

an inductor stage configured to locate the inductor
proximal the first location of the first metal fas-
tener; and a conveyor:

configured to drive the recycled wood workpiece
populated with metal fasteners through the
inductor volume; and comprising:

a set of input rollers:

coupled to an input side of the induction mod-
ule; and configured to constrain lateral sides of the
recycled wood workpiece at the input side; and a set of output rollers:

a coupled to an output side of the induction module; and configured to roll across lateral sides of the recycled wood workpiece at the output side to tamp burning wood material, in the recycled wood workpiece, around the first metal fastener.

11. The system of claim 1:

wherein the conveyor is configured to drive the recycled wood workpiece through the inductor volume, the recycled wood workpiece comprising a dimensional lumber:

exhibiting a two-inch by four-inch size;

populated with a first set of framing nails, comprising the first metal fastener, at a proximal end; and populated with a second set of framing nails at a distal end opposite the proximal end; and wherein the inductor stage is configured to locate the inductor proximal the first location of the first metal fastener on the proximal end of the dimensional lumber.

12. A system for removing fasteners embedded in a recycled wood workpiece comprising:

a fastener head removal module:

defining a work volume; and comprising a first cutter:

arranged within the work volume; and configured to:

resect heads from shanks of metal fasteners embedded within a first side of the recycled wood workpiece occupying the work volume; and remove a surface layer of wood material from the first side of the recycled wood workpiece; and comprising a second cutter:

arranged within the work volume adjacent the first cutter; and configured to:

resect heads from shanks of metal fasteners embedded within a second side, opposite the first side, of the recycled wood workpiece; and remove the surface layer of wood material from the second side of the recycled wood workpiece;

an induction module:

defining an inductor volume;

comprising:

a temperature sensor configured to output:

a first signal representing a first location of a first metal fastener embedded in the recycled wood workpiece occupying the inductor volume; and a second signal corresponding to a surface temperature of the recycled wood workpiece;

an inductor:

arranged within the inductor volume; and configured to generate an electromagnetic field that couples to and heats the first metal fastener via induction heating, the first metal fastener burning wood material, in the recycled wood workpiece, around the first metal fastener to reduce retention of the first metal fastener by the recycled wood workpiece; and an inductor stage configured to locate the inductor proximal the first location of the first metal fastener;

a fume hood:

coupled to the induction module; and configured to extract fumes from the inductor volume; and a controller configured to:

interpret the surface temperature of the recycled wood workpiece, proximal the first location, based on the second signal output by the temperature sensor; and in response to detecting the surface temperature exceeding a threshold surface temperature, activate the fume hood.

13. The system of claim 10:

wherein the first sensor is configured to output a second signal representing a second location of a second fastener embedded in the recycled wood workpiece;

wherein the inductor:

faces a first side of the recycled wood workpiece within the inductor volume; and is configured to generate the electromagnetic field that couples to and heats the first metal fastener embedded in the first side of the recycled wood workpiece; and wherein the induction module comprises:

a second inductor:

facing a second side orthogonal to the first side of the recycled wood workpiece within the inductor volume; and configured to generate a second electromagnetic field that couples to and heats the second metal fastener via induction heating, the second metal fastener burning wood material, in the recycled wood workpiece, around the second metal fastener to reduce retention of the second metal fastener by the recycled wood workpiece; and a second inductor stage configured to locate the second inductor adjacent the second location of the second metal fastener.

14. A system for removing fasteners embedded in a recycled wood workpiece comprising:

an induction module:

defining an inductor volume; and comprising:

a conveyor configured to drive the recycled wood workpiece populated with metal fasteners through the inductor volume;

a first sensor:

facing the inductor volume; and configured to output a signal representing a first location of a first metal fastener embedded in the recycled wood workpiece;

an inductor:

arranged within the inductor volume; and configured to generate an electromagnetic field that couples to and heats the first metal fastener via induction heating, the first metal fastener burning wood material, in the recycled wood workpiece, proximal the first location to reduce retention of the first metal fastener by the recycled wood workpiece; and an inductor stage configured to locate the inductor proximal the first location of the first metal fastener; and a fastener shank removal module:

arranged downstream of the induction module; and comprising:

a second sensor facing a work volume;

a stage supported by a chassis and configured to manipulate an extractor end effector to extract metal fasteners from the recycled wood workpiece; and the extractor end effector:

supported and manipulated on the chassis via the stage; and comprising:

a set of jaws configured to engage and retain metal fasteners from the recycled wood workpiece; and a jaw actuator configured to open the set of jaws at a first height and to close the set of jaws to engage metal fasteners from the recycled wood workpiece at a second height less than the first height.

15. A system for removing fasteners embedded in a recycled wood workpiece comprising:

an induction module:

defining an inductor volume; and comprising:

a conveyor configured to drive the recycled wood workpiece populated with metal fasteners through the inductor volume at a first speed in a first direction along a longitudinal axis of the induction module;

a first sensor:

facing the inductor volume; and configured to output:

a first signal representing a first location of a first metal fastener embedded in the recycled wood workpiece;

a second signal representing a second location of a second metal fastener embedded in the recycled wood workpiece;

an inductor:

arranged within the inductor volume; and configured to generate an electromagnetic field that couples to and heats the first metal fastener via induction heating, the first metal fastener burning wood material, in the recycled wood workpiece, proximal the first location to reduce retention of the first metal fastener by the recycled wood workpiece; and an inductor stage configured to:

locate the inductor proximal the first location of the first metal fastener;

drive the inductor at the first speed in the first direction for a target burn-out duration to maintain the inductor proximal the first location of the first metal fastener; and traverse the inductor in a second direction, opposite the first direction, to relocate the inductor proximal the second location of the second metal fastener in response to termination of the target burn-out duration for the first metal fastener.

\* \* \* \* \*